United States Patent [19]
Belitz et al.

[11] Patent Number: 5,870,715
[45] Date of Patent: Feb. 9, 1999

[54] LOGISTICS NETWORK FOR PROCESSING OF MAILED ARTICLES AND METHOD FOR CONTROLLING THIS NETWORK

[75] Inventors: Beate Belitz; Andreas Berends, both of Berlin; Tobias Eychmueller; Franz Kreitmeier, both of Konstanz, all of Germany

[73] Assignee: Licentia Patent-Verwaltungs-GmbH, Frankfurt, Germany

[21] Appl. No.: 632,452

[22] PCT Filed: Aug. 17, 1995

[86] PCT No.: PCT/EP95/03263

§ 371 Date: Jul. 3, 1996

§ 102(e) Date: Jul. 3, 1996

[87] PCT Pub. No.: WO96/05919

PCT Pub. Date: Feb. 29, 1996

[30] Foreign Application Priority Data

Aug. 19, 1994 [DE] Germany .......................... 44 29 469.7

[51] Int. Cl.⁶ .................................................. G06F 17/00
[52] U.S. Cl. .............................................................. 705/22
[58] Field of Search ...................... 345/200.36, 200.69, 345/200.71, 673, 674; 705/7, 9, 11, 22, 28, 29

[56] References Cited

U.S. PATENT DOCUMENTS

| | | | |
|---|---|---|---|
| 3,702,006 | 10/1972 | Page ......................................... | 395/675 |
| 4,495,570 | 1/1985 | Kitajima ................................. | 395/675 |
| 4,796,196 | 1/1989 | Durst, Jr. et al. . | |
| 5,068,797 | 11/1991 | Sansone et al. .................... | 364/478.07 |
| 5,072,401 | 12/1991 | Sansone et al. .................... | 364/478.07 |
| 5,287,271 | 2/1994 | Rosenbaum ................................. | 705/8 |
| 5,655,152 | 8/1997 | Ohnishi et al. ......................... | 395/856 |
| 5,666,493 | 9/1997 | Wojcik et al. ............................. | 705/26 |
| 5,692,192 | 11/1997 | Sudo ...................................... | 395/675 |
| 5,754,786 | 5/1998 | Diaz et al. ......................... | 395/200.53 |

FOREIGN PATENT DOCUMENTS

| | | |
|---|---|---|
| 0500180A1 | 8/1992 | European Pat. Off. . |
| 24 43 418 | 3/1976 | Germany . |

OTHER PUBLICATIONS

"R. Popescu–Zeletin et al"; A Service Platform for Distributed Applications; IEEE 1992.

*Primary Examiner*—Ellis B. Ramirez
*Attorney, Agent, or Firm*—Venable; George H. Spencer; Allen Wood

[57] ABSTRACT

A logistical network has nodes and edges, or transport links, which permit mailed articles that are being set from a sender to a receiver to be transferred, processed, and forwarded in a sequence which is predetermined in terms of time and place. The network includes devices for determining differences between nominal data describing the state of the logistical network and actual measured data. A controlled system is provided for minimizing differences in a predetermined period of time by shifting the processing of mailed articles from one node or a plurality of nodes of which the capacity is reduced with respect to the nominal data to one or a plurality of other nodes such that minimal additional expenditure is incurred.

13 Claims, 49 Drawing Sheets

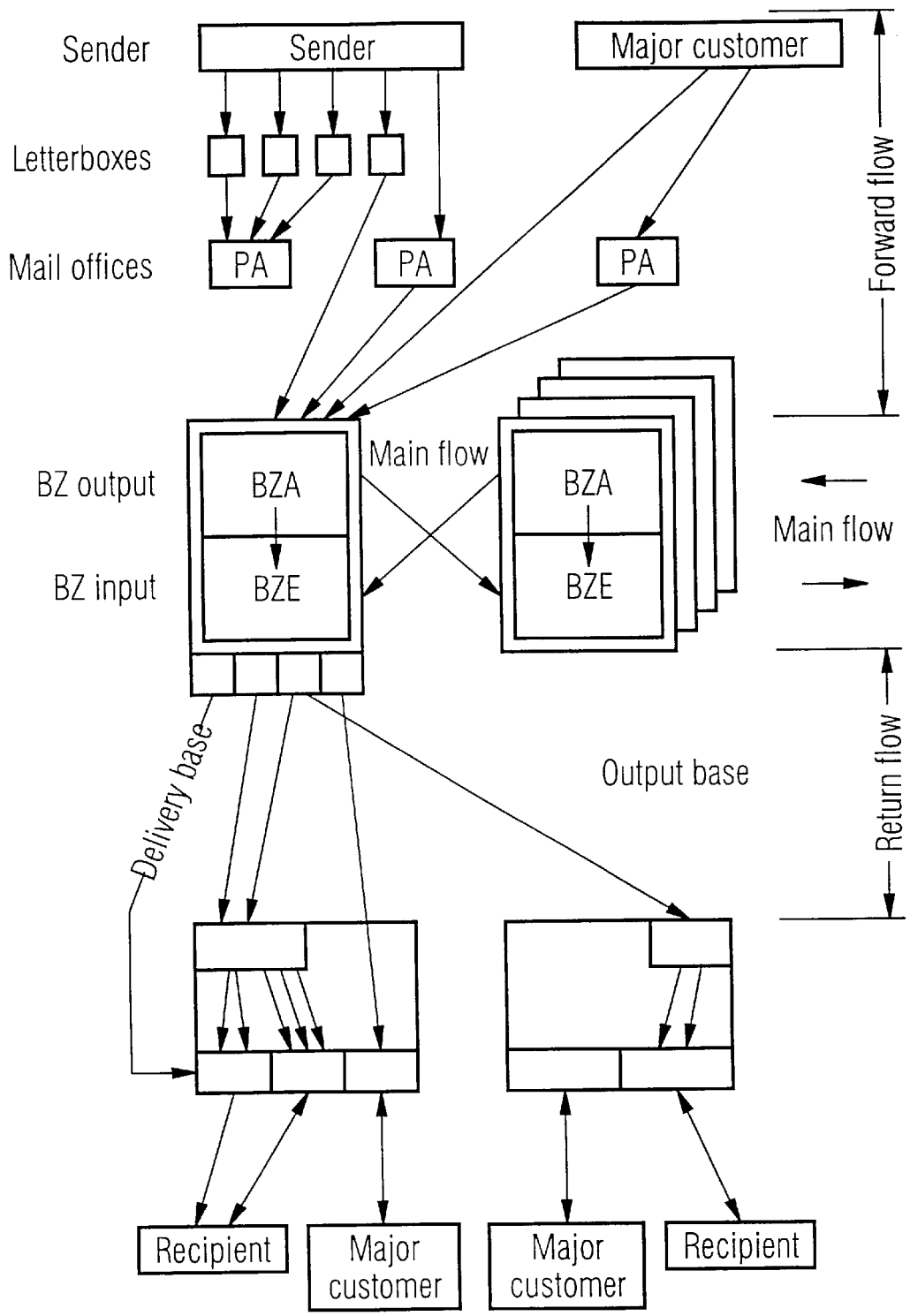

FIG 3

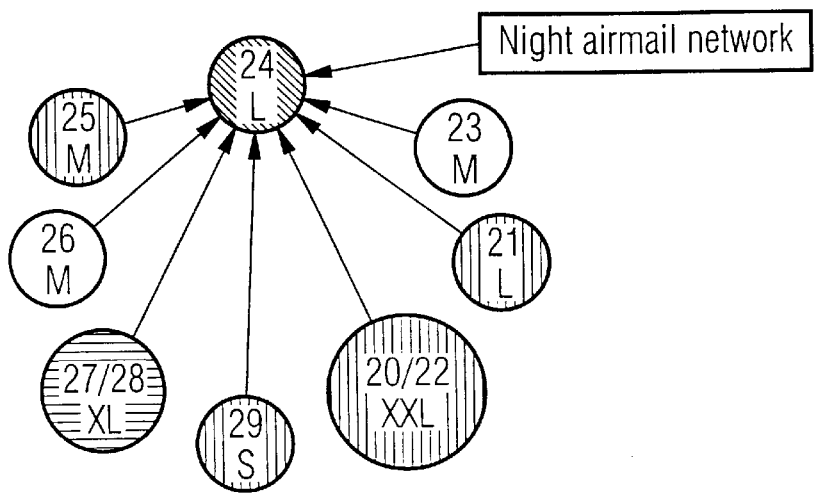

Legend

| | | | |
|---|---|---|---|
| ⊘ | BZE with capacity < dispatch quantity. Remaining quantity cannot be processed by the correct time. | ⊕ | BZA, contents of the output store for BZE 24 approximately equal to the remaining quantity. No free capacity for processing |
| ○ | BZA, contents of the output store for BZE 24 << or >> remaining quantity<br><br>↷ Not suitable as a diversion for variant 1.1 | ↷ | Not suitable as a diversion for variant 1.1 |
| → | Chosen diversion (in this case: the input processing for BZE 24 is moved to BZA 27/28) | ⊜ | BZA, contents of the output store for BZE 24 approximately equal to the remaining quantity. Free capacity available for processing<br><br>↗ Possible diversion for variant 1.1 |

FIG 4

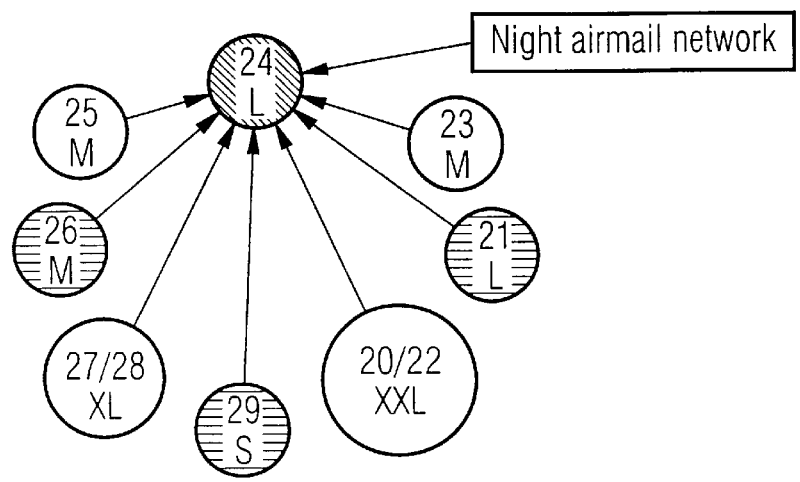

Legend

| | | | |
|---|---|---|---|
| ⊘ | BZE with capacity < dispatch quantity. Remaining quantity cannot be processed by the correct time. | ⊜ | BZA, contents of the output store for BZE 24 < remaining quantity. Free capacity for processing. Sum of the output stores equal to the remaining quantity |
| ○ | BZA, contents of the output store for BZE 24 >> remaining quantity and/or no free capacity for processing | ↷ | Possible diversion for variant 1.2 |
| ↷ | Not suitable as a diversion for variant 1.2 | | |
| → | Chosen diversion (in this case: the input processing for BZE 24 is moved to BZAs 21, 26 and 29) | | |

FIG 5

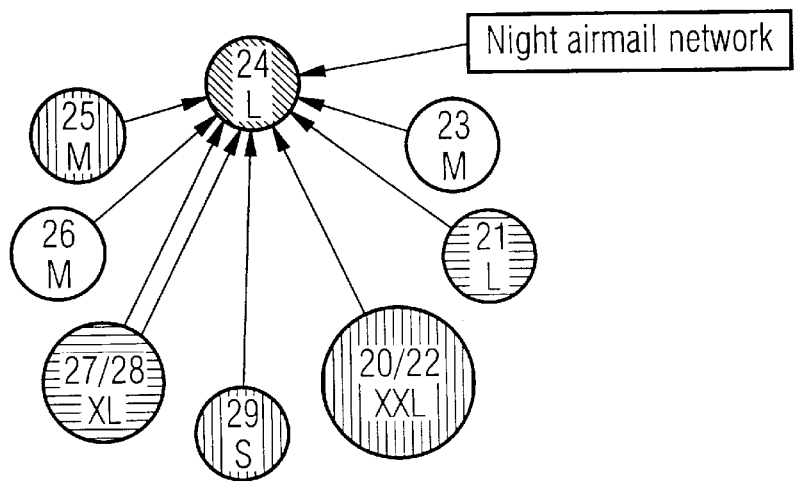

Night airmail network

Legend

| | | | |
|---|---|---|---|
| ◉ | BZE with capacity < dispatch quantity. Remaining quantity cannot be processed by the correct time. | ◐ | BZA, contents of the output store for BZE 24 > remaining quantity. No free capacity for processing. ↙ Not suitable as a diversion for variant 1.3 |
| ○ | BZA, contents of the output store for BZE 24 << remaining quantity. ↙ Not suitable as a diversion for variant 1.3 | ⊜ | BZA, contents of the output store for BZE 24 >> remaining quantity. Free capacity available for processing the subset, which corresponds approximately to the remaining quantity. ↙ Possible diversion for variant 1.3 |
| → | Chosen diversion (in this case: the input processing of a subset for BZE 24 is moved to BZA 27/28; additional transport is necessary) | | |

FIG 6

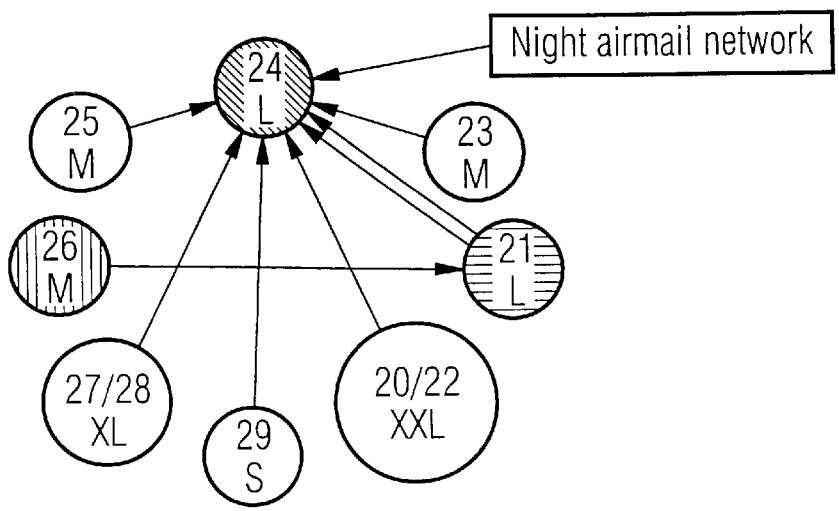

Night airmail network

Legend

| | | | |
|---|---|---|---|
| ◐ (diagonal hatch) | BZE with capacity < dispatch quantity. Remaining quantity cannot be processed by the correct time. | ◐ (vertical hatch) | BZA, contents of the output store for BZE 24 approximately equal to the remaining quantity. No free capacity for processing |
| ○ | BZA, contents of the output store for BZE 24 << remaining quantity | ⌒ | Not suitable as a diversion for variant 1.4 |
| ⌒ | Not suitable as a 1.4 for variant 1.4 diversion | ◐ (horizontal hatch) | BZA, contents of the output store for BZE 24 << remaining quantity. Free capacity available for processing the subset, which corresponds approximately to the remaining quantity. |
| → | Chosen diversion (in this case: the input processing of the dispatches of the BZA 26 for BZE 24 is moved to BZE 21; additional transport is necessary from BZA 26 to BZE 21 and from BZE 21 to BZE 24) | ⌒ | Possible diversion for variant 1.4 |

FIG 7

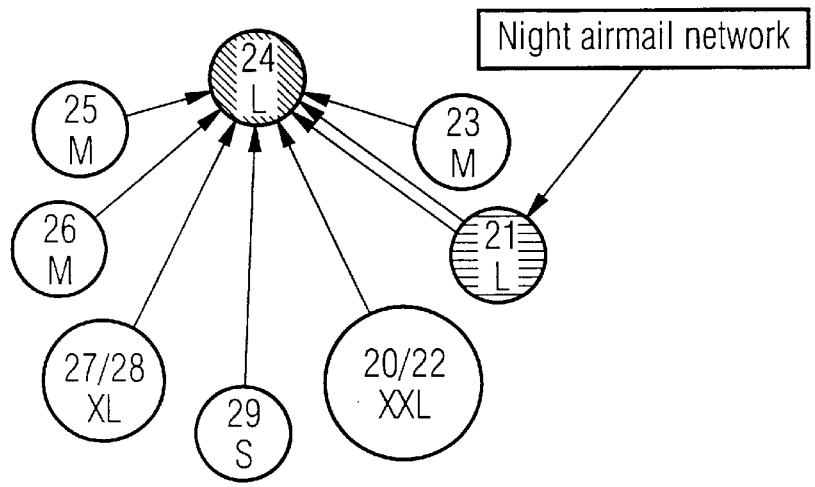

Night airmail network

Legend

| | | | |
|---|---|---|---|
| ⊘ | BZE with capacity < dispatch quantity. Remaining quantity cannot be processed by the correct time. | ☐ | Dispatch quantity from the night airmail network for BZE 24 approximately equal to the remaining quantity |
| ○ | BZA, contents of the output store for BZE 24 << remaining quantity | ↷ | Not suitable as a diversion for variant 1.5 |
| ↷ | Not suitable as a diversion for variant 1.5 | ⊜ | BZA, contents of the output store for BZE 24 << remaining quantity. Free capacity available for processing the subset, which corresponds approximately to the remaining quantity. |
| → | Chosen diversion (in this case: the input processing of dispatches for BZE 24 is moved from the night airmail network to BZE 21; additional transport is necessary from BZE 21 to BZE 24) | ↷ | Possible diversion for variant 1.5 |

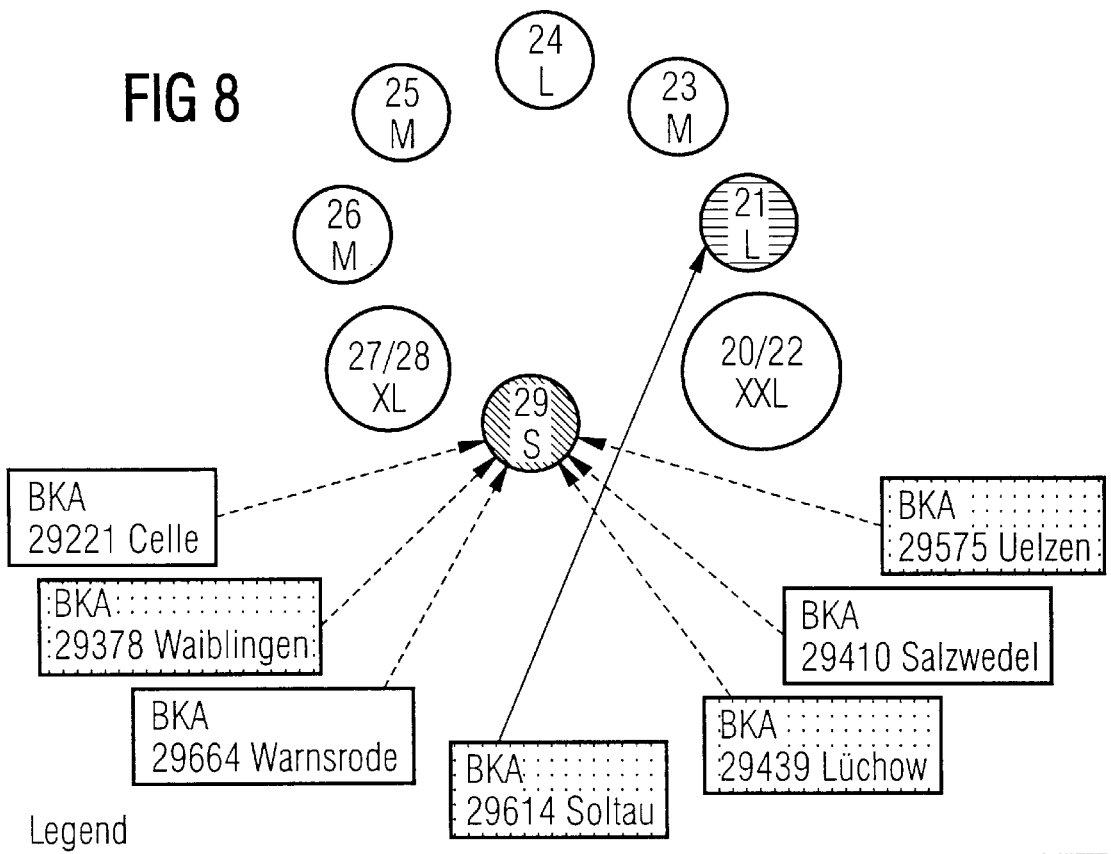

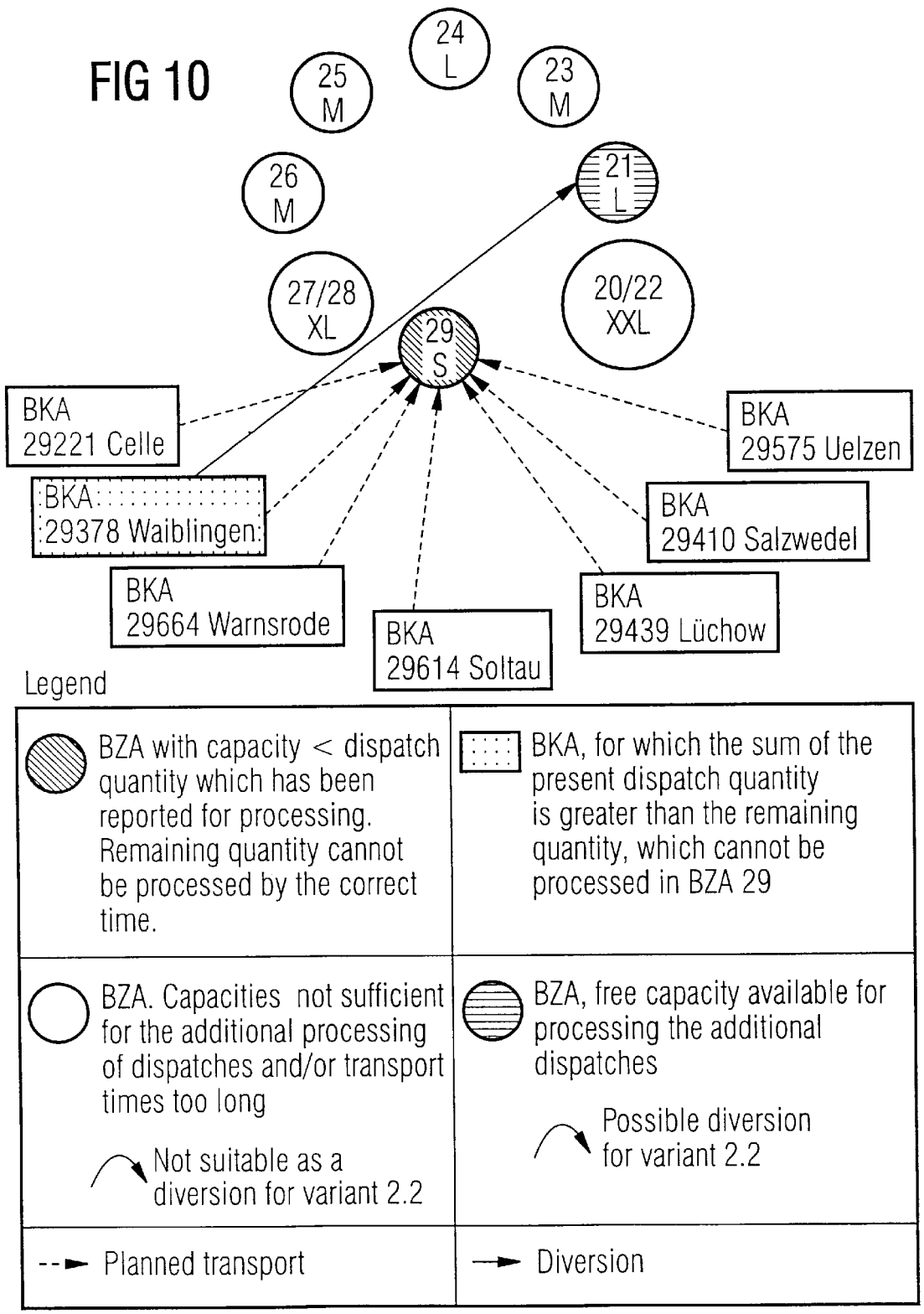

FIG 11

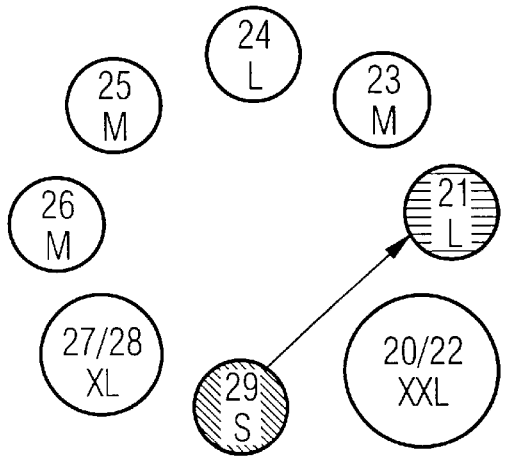

Legend

| | | | |
|---|---|---|---|
| ◎ | BZA with capacity < dispatch quantity present for processing in the BZA. Remaining quantity cannot be processed by the correct time. | ⊜ | BZA, free capacity available for processing the additional dispatches |
| | | ↷ | Possible diversion for variant 2.3 |
| ○ | BZA. Capacities not sufficient for the additional processing of dispatches and/or transport times too long | → | Diversion: Remaining quantity which cannot be processed in BZA 29 is diverted to BZA 21 |
| | ↷ Not suitable as a diversion for variant 2.3 | | |

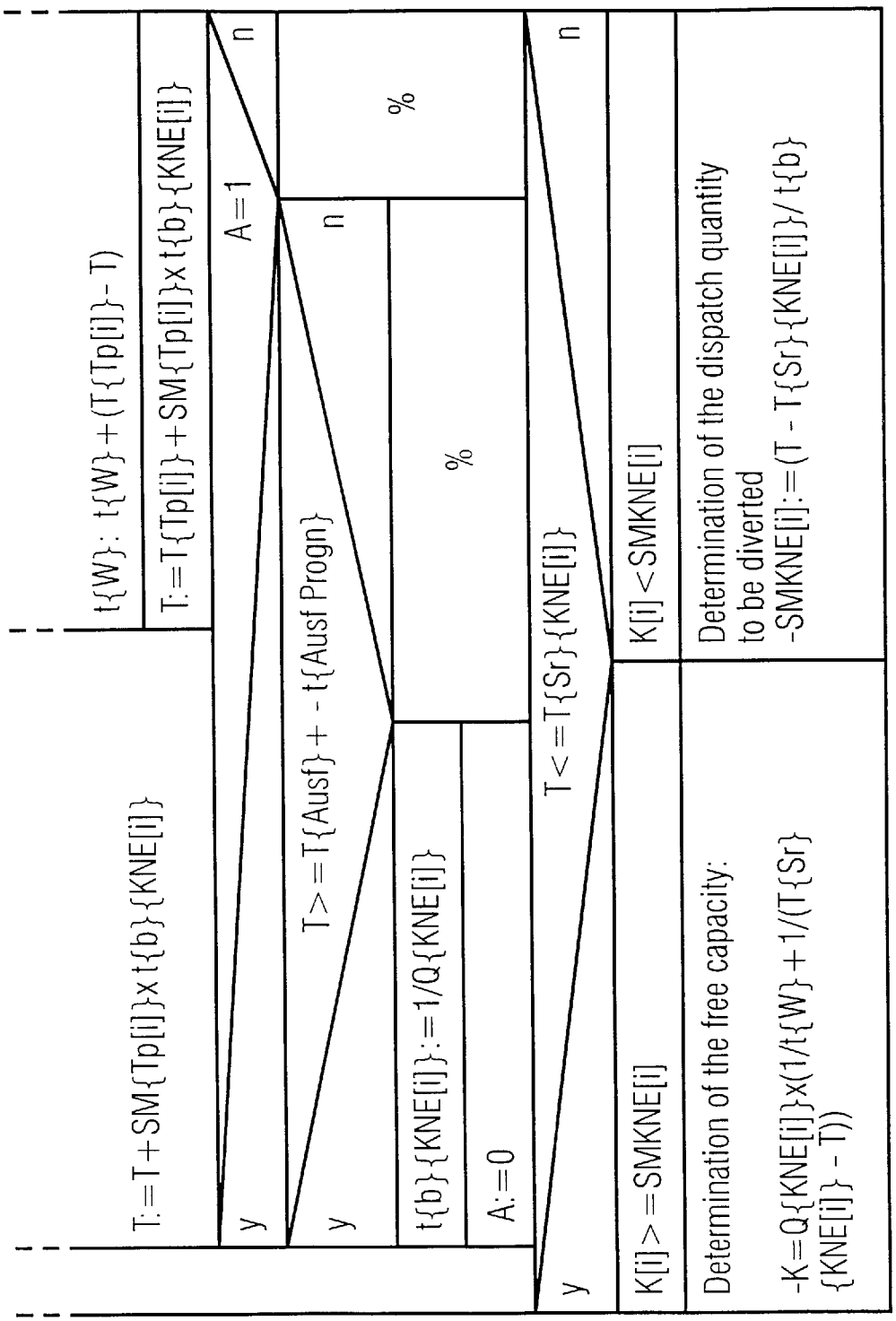

FIG 14 B

Variant 2.4
Diversion of the dispatches to a KNA other than the source KNA when said dispatches are already present in the source KNA and capacity failure then occurs

Variant 2.5
Diversion of a dispatch quantity, which has been reported by a major customer, to a KNA other than the source KNA

Variant 1.3
Input processing of the difference quantity of the KNE[crit] in a KNA; only processing of a subset of the dispatches which are present for the KNE[crit] there

Variant 1.4
Diversion of those dispatches which are present for the KNE[crit] in the KNA to another KNA having free capacity;
input processing there

Variant 1.5
Diversion of those dispatches which are present from the night airmail network for the KNE[crit] to a KNA having free capacity;
input processing there

FIG 15 A

The dispatches for the KNE are present in the output stores of the KNAs for the final time of processing of E+1-mail (21:00 hrs)

For all KNEs (Index i)

Determination of the dispatch quantity which is present for the KNE[i] for processing
SMKNEi = Ri + - Storage unit AS[i]

go to CAPACITY DETERMINATION KNE

K[i] >= SMKNE[i]

y  n

- SMKNE[i] > - y  n

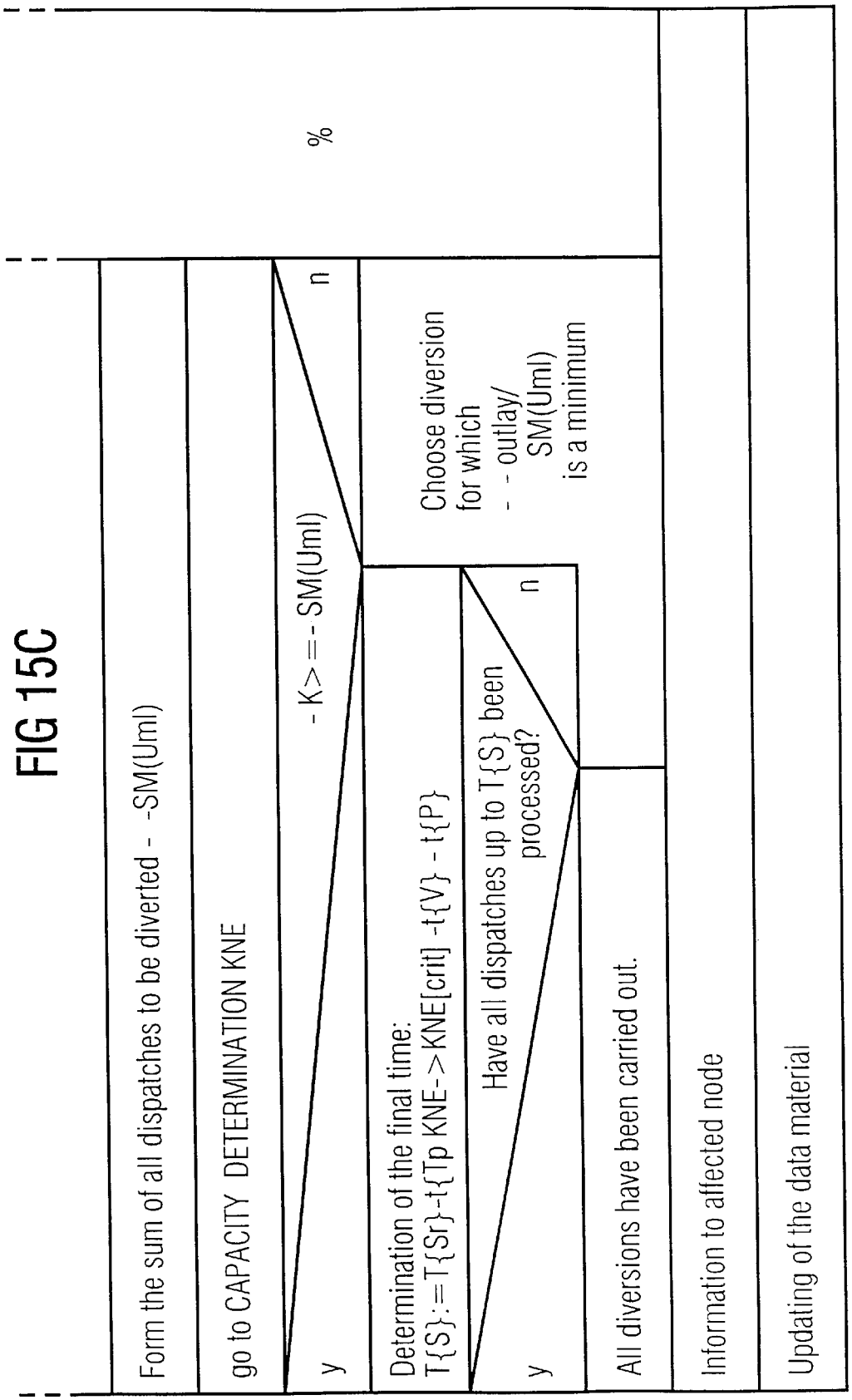

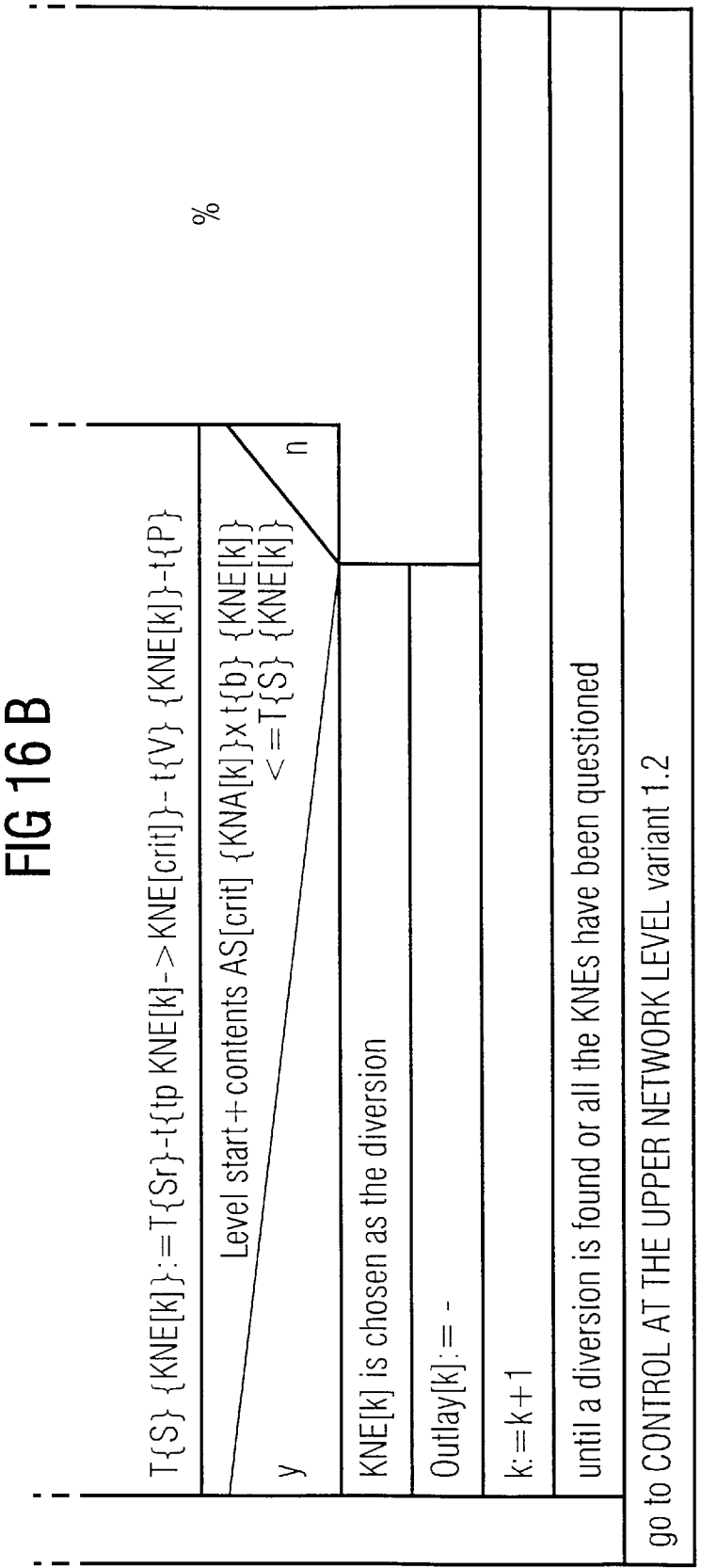

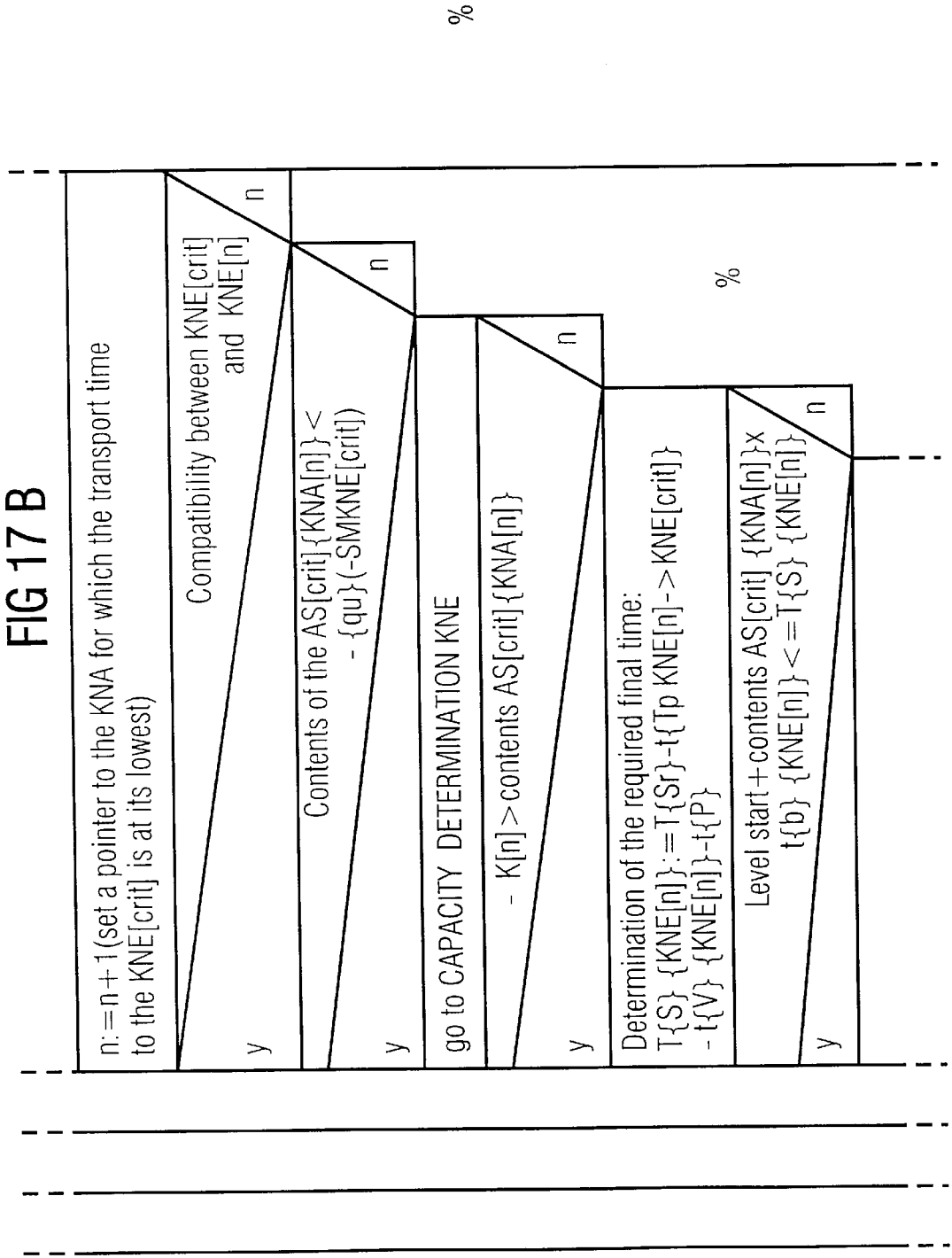

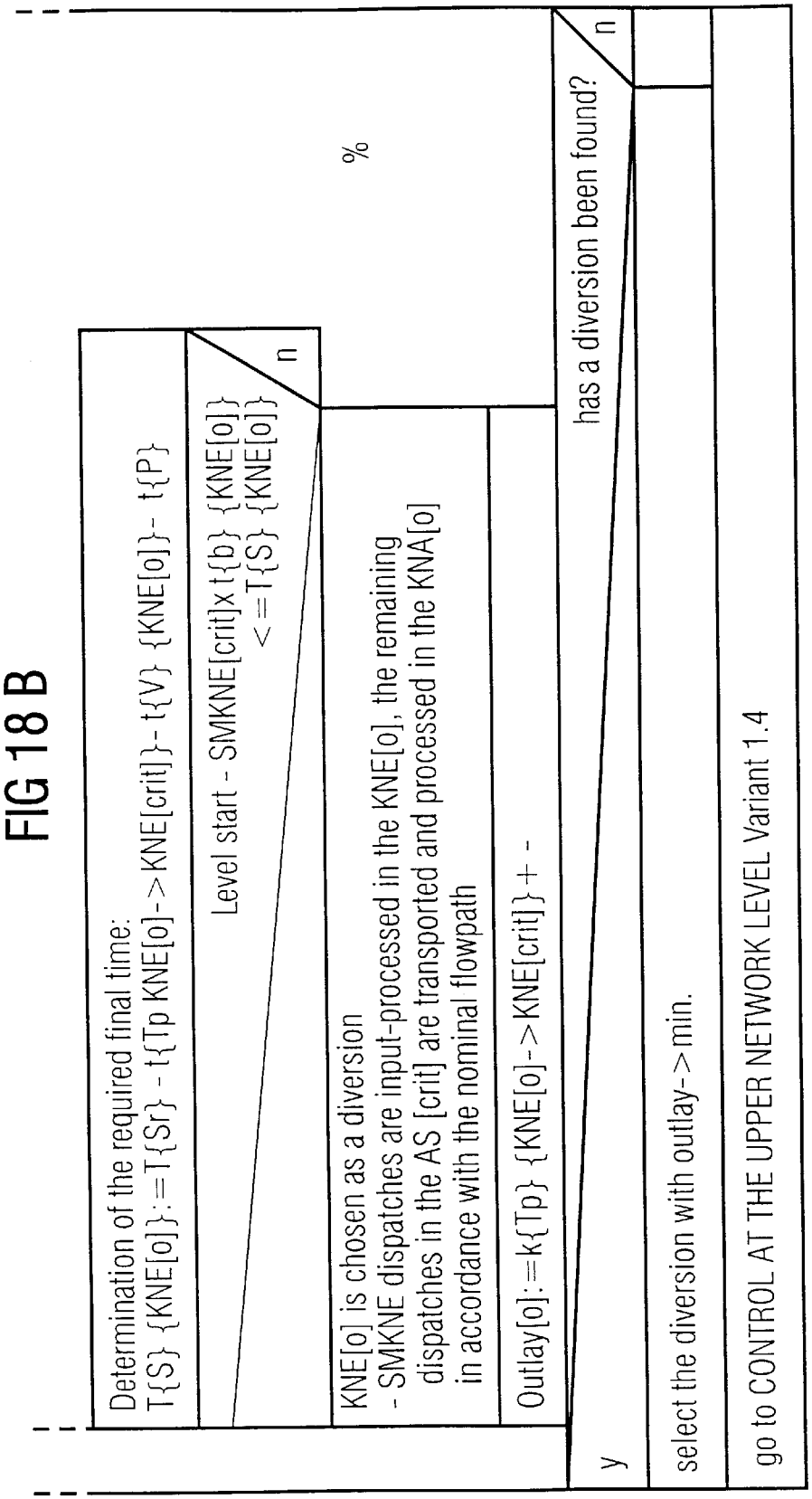

FIG 19 B

Determination of the required final time
$T\{S\}\{KNE[q]\} :=$
$T\{Sr\} - t\{Tp\ KNE[q] \rightarrow KNE[crit]\} - t\{V\}\{KNE[q]\} - t\{P\}$ $T\{Tp(KNE[p] \rightarrow KNE[q]) + $ contents $AS[crit]\{KNE[q]\} \times t\{b\}\{KNE[q]\} <= T\{S\}\{KNE[q]\}$ n — Diversion of dispatches of KNA[p] for KNE[crit] to KNE[q]; input processing there; dispatches of KNA[q] for KNE[crit] are transported and processed in accordance with the nominal flowpath y $T\{Tp(KNE[p] \rightarrow KNE[q]) + $ (contents $AS[crit]\{KNE[p]\}) \times t\{b\}\{KNE[q]\} <= T\{S\}\{KNE[q]\}$ y — Diversion of the dispatches of the KNA[p] and KNA[q] for KNE[crit] to KNE[q]: input processing there n $T\{Tp(KNE[p] \rightarrow KNE[q]) + $ contents $AS[crit]\{KNA[p]\} \times t\{b\}\{KNE[q]\} <= T\{S\}\{KNE[q]\}$ y — Diversion of dispatches of KNA[p] for KNE[crit] to KNE[q]; input processing there; dispatches of KNA[q] for KNE[crit] are transported and processed in accordance with the nominal flowpath n Outlay[q] := -

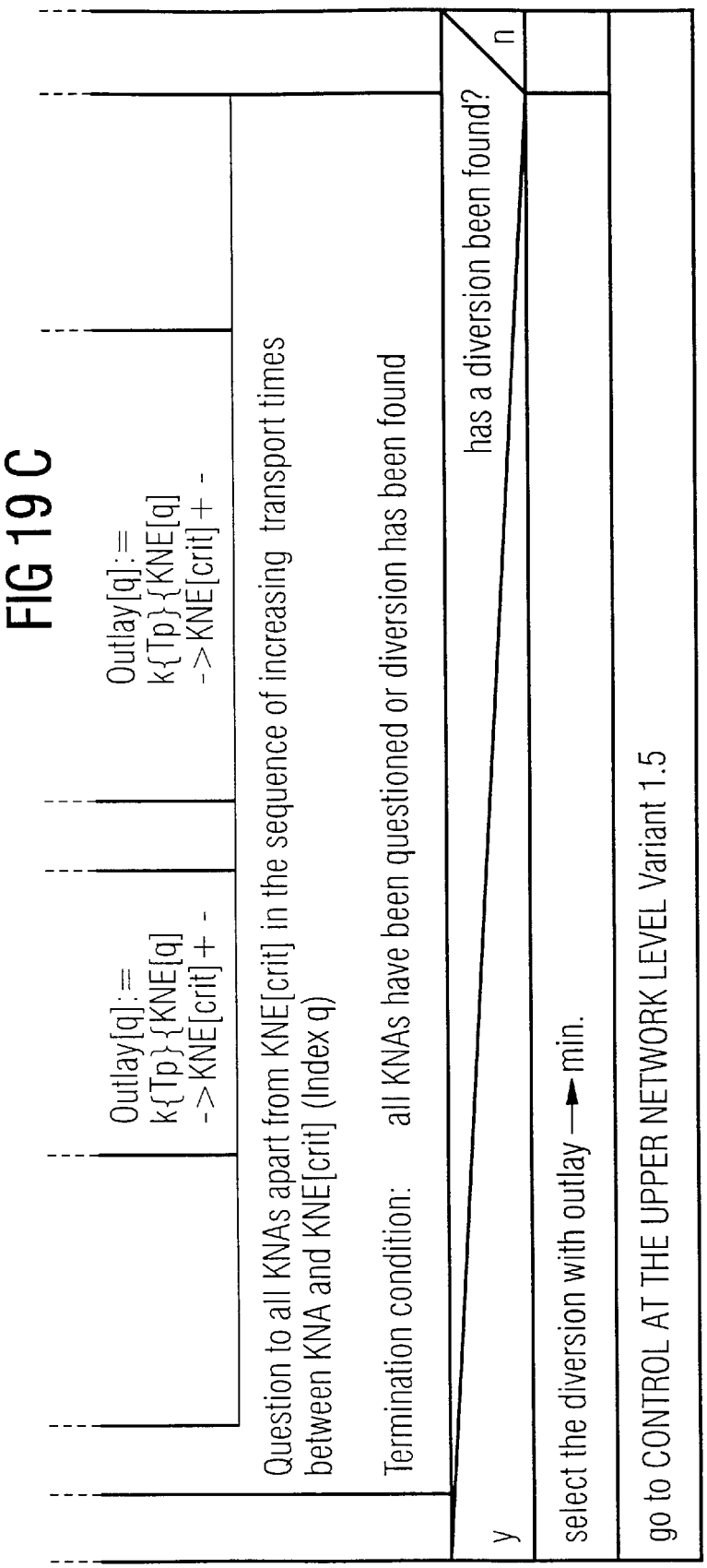

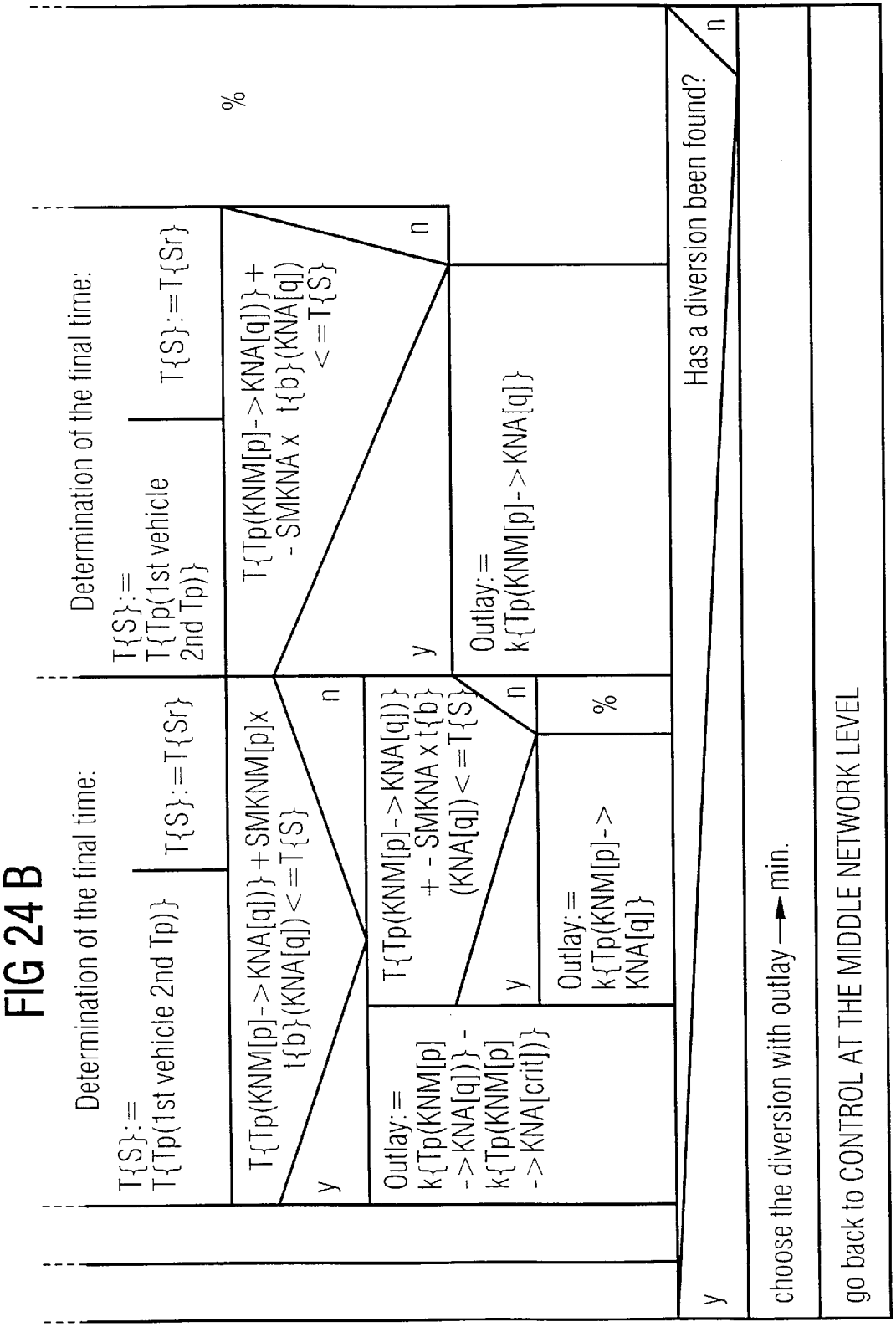

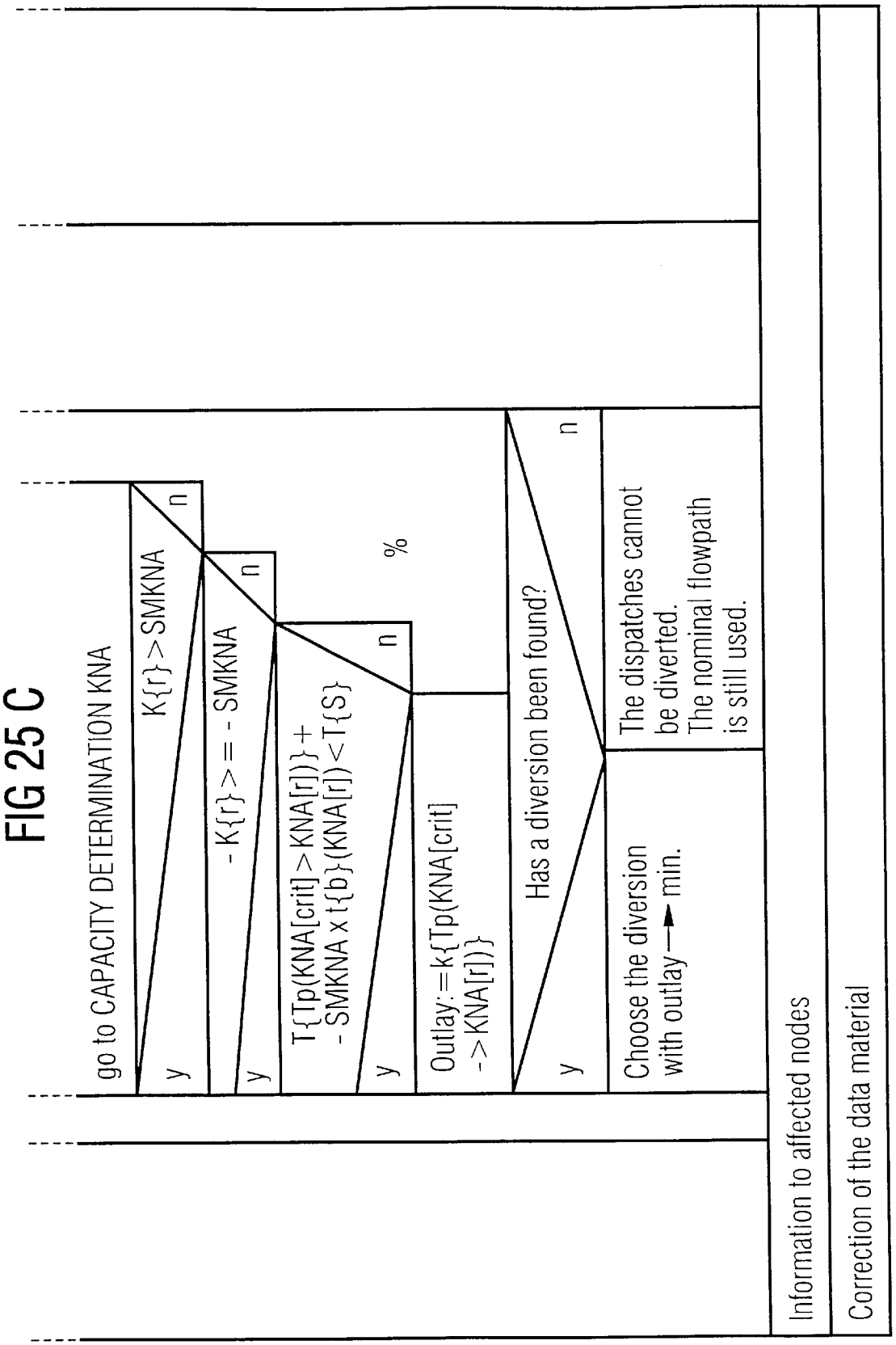

FIG 26 B

Questioning of all KNAs (apart from KNA[crit])　　(Index k)

go to CAPACITY DETERMINATION KNA

K{k} > SMKNA{k}　n
Defined nominal flowpath is still used y
- K{k} > = SMGK　n

T{S}{KNA[k]} := T{Sr(Infopost)}

T{Tp GK->KNA[k] + SMGK × t{b}{KNA[k]}
< = T{S}{KNA[k]}　n % y
KNA[k] is chosen as the diversion.

Defined nominal flowpath is still used

LOGISTICS NETWORK FOR PROCESSING OF MAILED ARTICLES AND METHOD FOR CONTROLLING THIS NETWORK

BACKGROUND OF THE INVENTION

The invention relates to a logistics network and a method for controlling a logistics network. More particularly, the invention is directed to a logistics network of the type having edges and nodes by means of which acceptance, processing, and passing on of mailed articles are carried out in a temporally and locally predetermined sequence, the network including devices in order to detect discrepancies between required data, which describe the logistic network state, and measured actual data.

BACKGROUND INFORMATION

The letter plays an important role in daily communication. Despite the continued development of modern communication means (for example telephone, fax and e-mail), the number of letters and packages is increasing. The breakdown of the mail-office monopolies makes market orientation and thus redirection of the commercial operation of the mail services, as well, essential, in particular greater orientation to maximizing the economy of the mail services and making letter and package processing effective.

The processes for mail processing (collection, transport, processing, delivery) are subject to both systematic and random influences in terms of the dispatch arising and the processing and transport capacities. The number of mailed articles or dispatches supplied for processing is influenced, inter alia, by severe cyclic fluctuations. Transport and processing processes are subject to disturbance influences, such as failure of machines or time delays resulting from weather or other environmental influences, for example. At present, the processes are rigidly organized in the mail services, that is to say fixed time windows and fixed capacities are available for implementation of these processes. It is thus not possible, or possible only to a limited extent, to react to such influences within the mail traffic system.

In order for this organization form to comply with the quality requirements for processing of dispatches, that is to say compliance with the throughput time, ensuring safety, reliability etc., the capacities are designed to match the traffic peaks. This design is based on the upper tolerance limit of the mean dispatch quantity to be processed. The consequence of this is that nodes and edges of the mail logistics network, that is to say processing points and transport links, are overdesigned for the dispatch arisings which occur as a rule.

SUMMARY OF THE INVENTION

The object of the present invention is thus to specify a logistics network and a method for controlling a logistics network, using which the mailed article or dispatch flow is made flexible, in such a manner that the resources which are required to carry out the processing processes are matched to the actual requirement, such that excess resources are minimized. This object can be achieved, in a logistics network of the type described at the outset, by providing a controller in order to minimize the discrepancies in a predetermined time by moving the processing of mailed articles or dispatches from one or more nodes, whose capacity is less than the required data, to one or more other nodes in such a manner that a minimal additional outlay is incurred.

The invention makes it possible to avoid bottlenecks and time delays resulting from them in dispatch processing, and to achieve control of the use of major resources throughout the entire supply area of the relevant mail service.

BRIEF DESCRIPTION OF THE DRAWINGS

The invention is described in more detail in the following text, with reference to the drawings, in which:

FIG. 2a shows the dispatch flows in a logistics network;

FIGS. 3–11 show various movement options at the upper and middle network level.

FIGS. 12A and 12B show an organizational chart for upper level input processing node capacity determination;

FIGS. 21–21C are organizational charts showing control at the middle network level.

DETAILED DESCRIPTION OF THE PREFERRED EMBODIMENTS

The definitions listed below are assumed throughout the following text:

Flowpath

The flowpath is the temporally and locally predetermined sequence in which the nodes and edges of a logistics network accept, process and pass on dispatches or transport units with dispatches. A nominal flowpath is defined for the normal situation.

Dispatch

Dispatches (occasionally called "mailed articles") are directed from a sender to a recipient. The path of the dispatch through the mail logistics network results from this.

Flowpath Control

The flowpath control is the deliberate influencing of the nominal flowpath in accordance with the requirements of the logistics network. The flowpath control ensures the flow of dispatches through the logistics network, to be precise such that minimal time losses in the event of waiting times resulting from jams, and thus compliance with the quality characteristic of throughput time are ensured with minimal outlay. The input parameter for flowpath control is in this case the condition of the system, which is characterized by the dispatch quantities to be processed, the capacities which are available for this purpose, and the time window for the process. The output variable is the controlled flowpath.

Furthermore, a Table that is presented alter on lists abbreviations and formula symbols that will be used in what follows.

Figure 1:
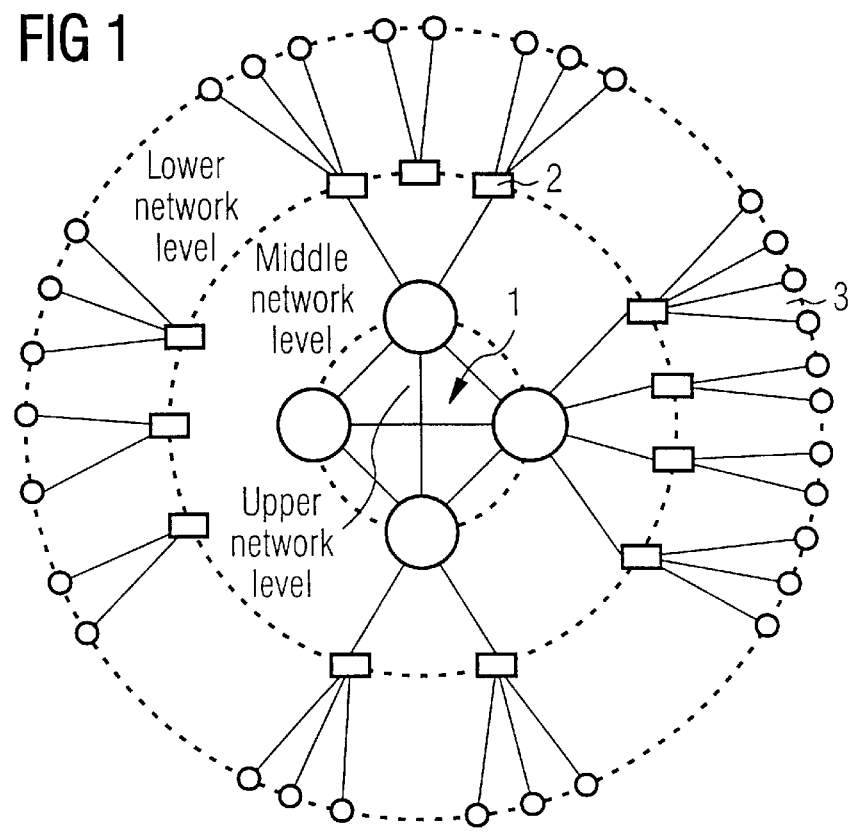
FIG. 1 shows the network structure of a mail traffic network.

FIG. 1 shows the structure of a mail traffic network.

The network levels are in this case delineated as follows:

The upper network level 1 contains all processes which are located between the start of the output processing in the nodes in the upper network level and the end of the input processing in the nodes in the upper network level. The middle network level comprises the processes between the start of processing of dispatches in the nodes in the middle network level 2 and the input of the dispatches in the nodes in the upper network level for output processing. In addition, the middle network level comprises all processes between the end of input processing in the nodes in the upper network level and the end of processing in the nodes in the middle network level. The lower network level 3 contains all processes between delivery of the dispatches and input in the nodes in the middle network level. The lower network level also deals with all processes between the end of processing of the dispatches in the nodes in the middle network levels and their delivery.

Figure 2:
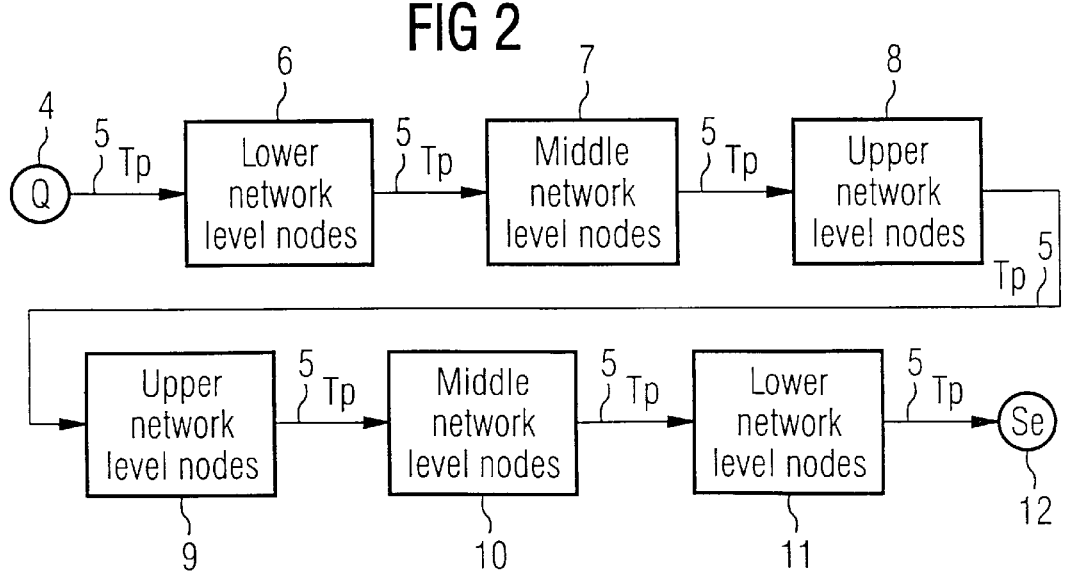
FIG. 2 shows a flowpath in a logistics network according to FIG. 1.
Figure 9:
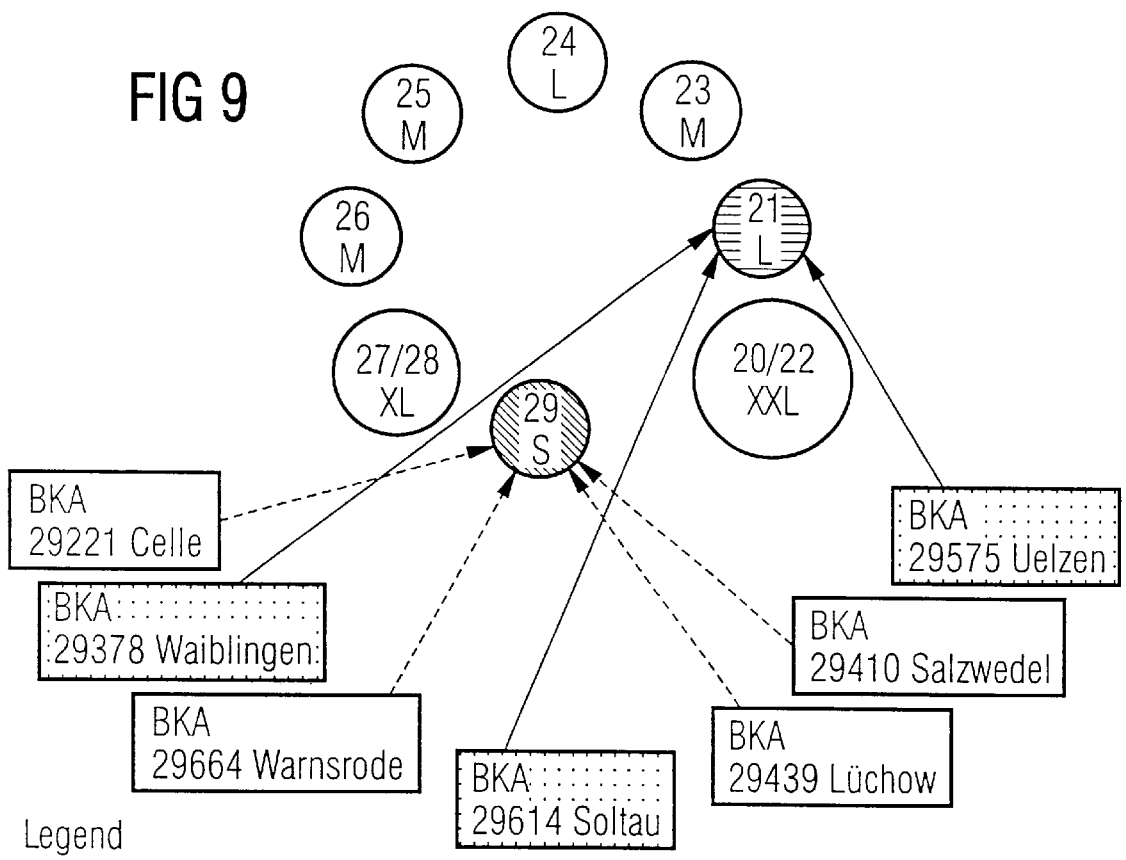

FIG. 2 shows the breakdown of the flow path in a logistics network according to FIG. 1. Starting from a source 4, the dispatches are sent via transport paths 5, nodes in the lower network level 6 and via further transport paths 5 to the nodes in the middle and upper network level 7, 8 and, starting from there, are transported via nodes in the upper, middle and lower network levels 9, 10, 11 to the sink 12, that is to say to the recipient. The flowpath control can act on any of these sections, that is to say it can control the flowpath of the dispatch flow or of a part of it.

If, for example, the capacity of a node in the middle level is to low to satisfy the time and quality requirements for all mailed articles or dispatches to be processed in this node, then the processing of a part of this dispatch flow should be carried out in another node. The flowpath control analyzes the mail traffic system to determine the necessity for diversions. If required, suitable diversions are chosen. To this end, it is necessary to detect the actual condition of the system, to predict system conditions to be expected in the medium term, to assess the effects of flowpath alternatives, to make decisions and to implement these decisions. The implementation comprises passing information, for example, on to nodes which are intended to pass dispatches on other than by the required flowpath and, resulting from this, to initiate the required measures. In addition, control of the scope of processing in the individual nodes can be included. If machines fail during processing, it is necessary to decide whether further processing is to be carried out in another node.

The dispatch flows between the source and the sink are illustrated in FIG. 2*a*, for clarification. The dispatch flow is split into forward, main and return flow. The forward flow includes all processes from receipt of the dispatches to input into the letter center output BZA, the main flow includes the processes between input into the BZA and the end of the processing in the letter center output BZE. The return flow includes the subsequent processes as far as the input in the delivery base or output base.

Control of transport and processing capacities as well as flexible planning of the use of personnel are linked to all control functions.

An important precondition for the capability to use flowpath control successfully and for the achievement of the desired effects is central and immediate evaluation of traffic quantities, current capacities and other data. This point of data acquisition and evaluation is of major importance since it provides the basis for an optimum decision.

The invention is presented in the following text using the example of a logistics network having a plurality of network levels. Specifically, control methods are presented for the upper network level and for the middle network level. There are nodes in this level for output and input processing.

The control in the upper network level influences the section of the flowpath of the mail dispatches between the processing nodes in the upper network level which carry out the output processing, that is to say format separation, recording, stamping, encoding, and output sorting, and the processing nodes in the upper network level which carry out the input processing, that is to say input sorting. The nodes in the upper network level for the output processing are called KNA in the following text, and the nodes in the upper network level for input processing are called KNE.

A controlling action is carried out when the existing capacity in a node for input processing is not sufficient to process in this node those mailed articles or dispatches which are present or have been reported for that node, by the correct time and with the correct quality. The result of the control action must therefore be to move the functions of this node to another node in the upper network level for all the dispatches or for a subset of the dispatches. This is intended to ensure that the quality requirements for these dispatches are satisfied.

The control in the middle level influences the flowpath between the nodes in the middle network level (called KNM in the following text) and the nodes for output processing in the upper network level. For the case in which the capacity in an upper level output node KNA is insufficient to process all the present dispatches and the dispatches to be expected from the associated middle level nodes KNMs at the correct time, it is necessary to divert dispatches to another node for output processing in the upper network level.

Control in the Upper Network Level

Control in the upper network level means control of the flowpath between the upper level output nodes KNAs and the upper level input nodes KNEs. Particularly with respect to satisfying the time specifications for processing, it is necessary, for this control, to determine, at the end of processing in the upper level output nodes KNAs, the number of dispatches which are present for the individual upper level input nodes KNEs. To this end, all the upper level output nodes KNAs are interrogated to determine how many dispatches they have for processing for which KNE.

The acquisition can be carried out, for example, by evaluation of machine protocols or counting or weighing the containers present for the upper level input nodes KNEs, and multiplication by a factor. In addition, the residues which exist in the KNEs must also be taken into account.

The determined number of dispatches is compared with the available capacity for each upper level input node KNE. In this case, current failures are taken into account only if they are predicted to last beyond the start of the input processing and seriously limit said input processing. It is assumed, for example, that this is the case if the capacity of the node is limited for more than ½ h. Account is furthermore taken of the fact that the dispatches arrive at the upper level input nodes KNEs at different times and that, in consequence, idle times may occur during the processing. If the dispatch quantity exceeds the capacity by a defined limit value $\epsilon$, the flowpath control must act and divert a part of the dispatch quantity for processing in another upper level input node KNE. The nodes to which this applies are called $KNE_{crit}$ in the following text; the dispatch quantity by which the capacity is exceeded is called the excess input quantity ΔSMKNE. The calculation of the diversion is carried out using special algorithms, one of which is described by way of example in the following text.

It is presupposed that the machine programs in the fine sorting systems in the upper level input nodes KNEs can be converted such that the input sorting can also be carried out for areas other than its own. A further parameter which must be taken into account for the control in the upper network level is the number of sorting compartments or delivery points from the sorting systems which are used. In order to ensure smooth input processing of the dispatches, only those upper level input nodes KNEs should be considered for diversion which are compatible with the insufficient-capacity upper level input node $KNE_{crit}$ in terms of the number of sorting compartments or delivery points. This condition is satisfied when:

---
Number of compartments in the KNE ≧ number of compartments in the $KNE_{crit}$
---

Diversions which can be implemented on the basis of specific criteria are determined for the controller, which can be implemented in various variants and of which only one is described in detail in the following text. From these diversions, that diversion is determined for the insufficient-capacity upper level input node $KNE_{crit}$ for which a minimum additional outlay is incurred. Once the capacity of all the upper level output nodes KNAs has been checked and a diversion within the overall logistics network has been selected for the insufficient-capacity upper level input node $KNE_{crit}$, the control now passes to repeated selection of a node as a destination of a diversion. When this is the case, the system now determines whether the node under consideration is able to process all dispatches diverted to it, in addition. If its capacity is not sufficient, that diversion which is the most effective is selected from the previously determined diversions. No other diversions which end at this node are implemented. The effectiveness rate is determined as follows:

$$v = \frac{\text{outlay}}{SM_{uml}}$$

Outlay—the additional outlay resulting from the diversion.
$SM_{Uml}$—quantity of dispatches which are diverted using the diversion under consideration.

A preferred variant of the control of the flowpath of a dispatch within the above network level includes the following algorithm:

An upper level output node KNA is sought in the case of which the dispatch quantity which is present for the insufficient-capacity upper level input node $KNE_{crit}$ at the end of processing is within a defined interval. There are various options for defining this interval. An interval size is regarded as sensible here which depends on the extent of the dispatch quantity to be diverted:

$$\tau qu(\Delta SMKNE) \leq \text{Sdgs-quantity for } KNE_{crit} \leq \tau qo(\Delta SMKNE)$$

where $$\tau_{qu} \approx \bar{x}n \left( \frac{\sqrt{4\bar{x}^{2-2b} - 1} + \lambda_{1-\gamma}}{\sqrt{4n\bar{x}^{2-2b} - 1} + \lambda_q} \right)^2$$

$$\tau_{qo} \approx \bar{x}n \left( \frac{\sqrt{4\bar{x}^{2-2b} - 1} + \lambda_\gamma}{\sqrt{4n\bar{x}^{2-2b} - 1} + \lambda_{1-q}} \right)^2$$

$\tau_{qo}$—upper tolerance limit
$\tau_{qu}$—lower tolerance limit
x—ΔSMKNE (number of dispatches to be diverted
n—sample size (assumed to be 10 here)
b—scatter parameter
$\lambda_q, \lambda_\gamma, \lambda_{1-q}, \lambda_{1-\gamma}$—Quantile of the standardized normal distribution If an upper network level node KN is found for which the precondition mentioned above is satisfied, its capacity is determined and a check is carried out to find out whether the dispatch can be processed in this node (in the following text KNE, since the input processing is carried out there). To this end, a check is to carried out to find out whether all dispatches for the dedicated area can be processed and, in addition, whether free capacity is available. The free capacity should be sufficient to allow all the dispatches which are present in the output store for the insufficient-capacity upper level input node $KNE_{crit}$ to be processed. In addition, it is necessary to check whether the available time is sufficient to transport these dispatches, after input processing, into the insufficient-capacity upper level input node $KNE_{crit}$ for further processing, so that the dispatches are available at the planned final time in the insufficient-capacity upper level input node $KNE_{crit}$. This is preconditional on the diverted dispatches being processed immediately in the upper level input node KNE, before the processing of the dispatches for its own area. The procedure for checking whether the time is sufficient is as follows:

1. Determination of a final time for the diverted dispatch in the upper level input node KNA:

$$T_S(KNE) = Tsr - tTpKNE \rightarrow KNE(crit) - tv(KNE) - tp$$

where:
$T_S(KNE)$—Final time in the KNE
$T_{Sr}$—regular final time in the $KNE_{crit}$
$tT_pKNE \rightarrow KNE(crit)$—time for transport between KNE and $KNE_{crit}$
$t_v$—time for dispatch completion in the KNE
tp—buffer time The buffer time includes the time elements which are additionally required for dispatch completion and transport, for example training the personnel.

2. Question as to whether the time before the determined final time is sufficient for processing:

$$\text{Start of processing} + \text{number of dispatches for } KNE_{crit} \times tb(KNE) \leq T_S(KNE)$$

where:
$t_b(KNE)$—mean processing time in the KNE

An upper level input node KNE which satisfies all the above conditions can be chosen as a diversion.

Since the processing of the dispatches is a time-critical process, the question to the upper level nodes KNs as to whether they are possible diversions is carried out in the sequence of increasing transport times between the node and the insufficient-capacity upper level input node $KNE_{crit}$. As soon as a decision for an upper level input node KNE has been made that it is able to carry out the additional processing of the diverted dispatch, this is chosen as a diversion of the first variant.

The advantage of this variant for moving processing processes is that no additional transports are required. The transport between the two nodes, which are influenced by the flowpath control, in the upper network level is purely time-shifted. If the transport takes place without any control action between the output and the input processing, it is now carried out after the input processing of the dispatch.

The additional outlay in this variant is a fixed value κ, which essentially comprises the costs for conversion of the machine programs.

Control in the Middle Network Level

Control in the middle network level means control of the flowpath between the nodes in the middle network level and the nodes for the output processing in the upper network level (see also FIG. 1).

On days on which dispatches are processed in the upper level output nodes KNAs, more than one transport takes place as a rule in order to supply the dispatches from the middle level nodes KNMs to the upper level output nodes KNAs for processing. It is therefore possible to take control actions a number of times during the day. Two transports per day are assumed in the following explanations.

At an agreed time before departure of the transports from the middle level nodes KNMs to the upper level output nodes KNAs, the dispatch quantity is determined which is present in the middle level nodes KNMs for further processing in the upper level output nodes KNAs. If no numbers exist relating to the current dispatch quantities, it is also possible to work with predicted dispatch numbers in this case. The dispatch quantity also includes the residues which are present in the upper level output nodes KNAs. Then:

$$SMKNA = R_{KNA} + \sum_{i=1}^{m} SMKNM$$

m—number of KNMs assigned to the KNA

A check is carried out to find out whether the capacity of the upper level output nodes KNAs is sufficient to process this dispatch quantity by the correct time and with the correct quality. At the same time, a determination is made in the upper level output node KNA, taking account of serious failures in the upper level output nodes KNAs and the time of arrival of the dispatch, as to whether the available time is sufficient for the complete processing of the quantities SMKNAs that are present in the upper level output nodes KNAs for processing. A check is first carried out for the first transport which takes place to determine whether the dispatches can be processed before arrival of the first vehicle of the second transport. If it is predicted that the processing will not be completed by this time, a check is carried out to find out whether the time remaining before the final time is sufficient for processing the dispatch quantity which is expected for the entire day. Predicted values are used for the dispatch quantity of the second transport. If the dispatch quantity then also exceeds the capacity of the node by the limit value ε defined in Formula 1, an attempt is made to divert a part of the dispatch to another node. This also applies to the second transport, if the calculated processing interval required extends beyond the final time. In this case, various variants are used, of which one chosen variant is described in the following section.

Nodes whose capacity is not sufficient for processing by the correct time are called $KNA_{crit}$, by analogy, in the following text, and the number of dispatches beyond the capacity is called the excess quantity ΔSMKNA.

In this variant of the control in the middle network level, those KNMs are sought for which:

$$\tau qu(\Delta SMKNA) \leq SMKNM \leq \tau qo(\Delta SMKNA)$$

where $\tau_{qu}$ (ΔSMKNA) is the lower tolerance limit and $\tau_{qo}$ (ΔSMKNA) the upper tolerance limit of the dispatch quantity to be diverted.

A diversion for those dispatches which are present in this node to another upper level output node KNA is sought for middle level nodes KNMs which satisfy this condition. In order to find such another upper level output node KNA, all upper level output nodes KNAs are checked, in the sequence of rising transport times between the middle level node KNM and the upper level output node KNA, for their free capacities and compliance with the final times. The following items must be true for upper level output nodes KNAs which are possible diversions:

1. ΔK>SMKNM
   i.e. the free capacity of the KNA must be greater than the dispatch quantity present in the KNM.
2. Processing end (KNA)—$T_{TpKNM\rightarrow KNA}$>SMKNM×tb (KNA)
   that is to say the time in which the dispatches which are ready in the KNA for processing must be greater than the required processing time.

Additional outlay is incurred for such a diversion, amounting to:

$$\text{Outlay}=kTp\ KNM\rightarrow KNA-kTpKNM\rightarrow KNA_{crit}$$

The combination of a KNM and a KNA for which the additionally required outlay is a minimum is chosen as the diversion.

Figure 12A:
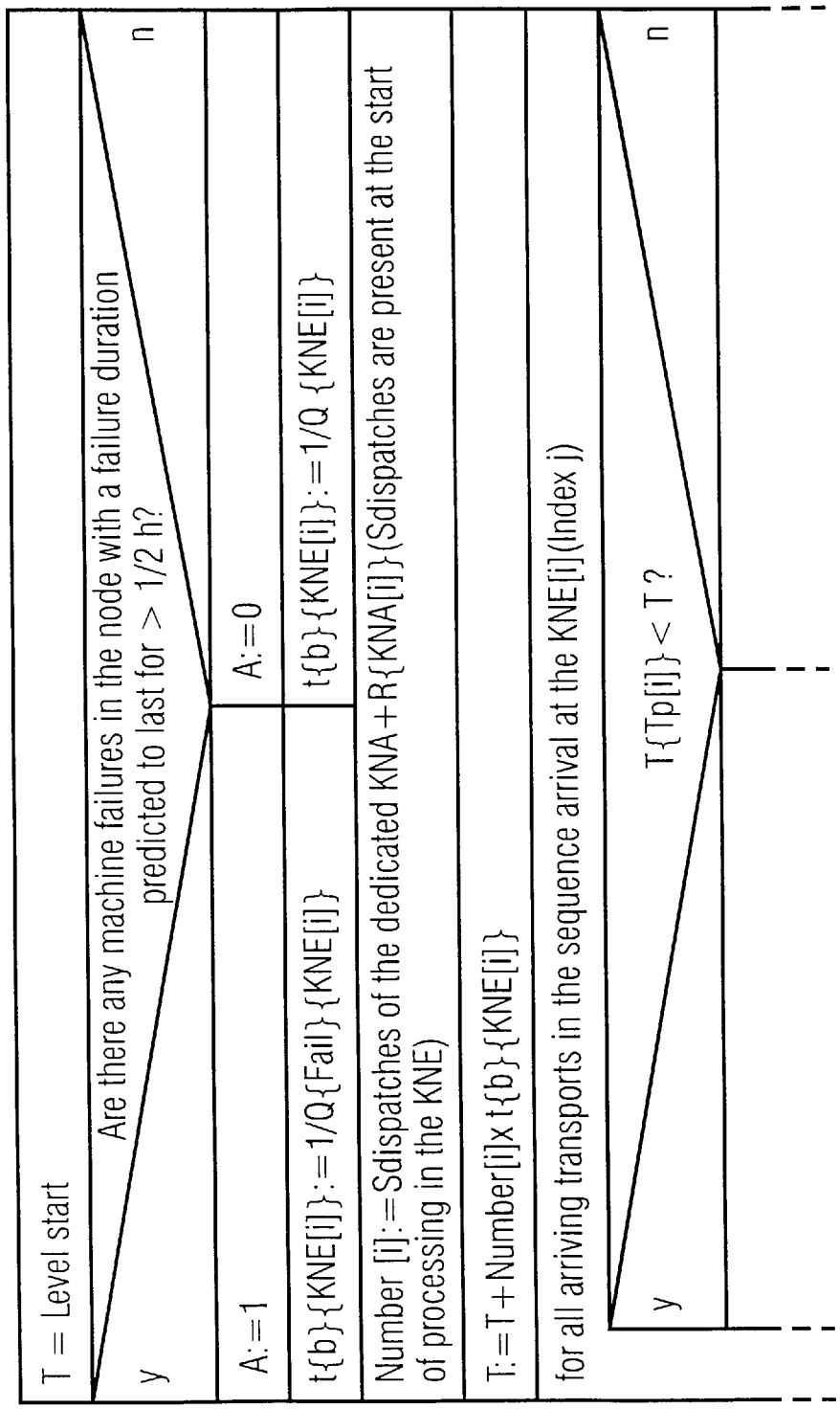
Figure 13:
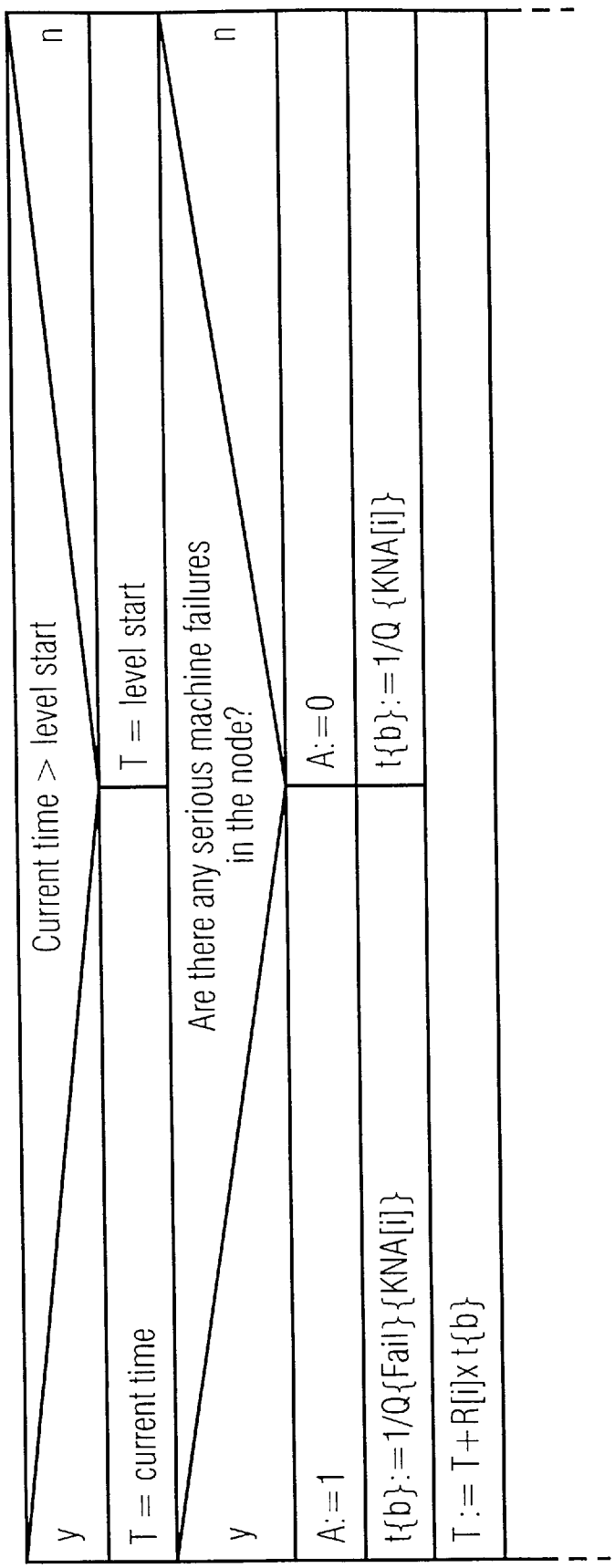
FIGS. 13A–13C show an organizational chart for upper level output processing node capacity determination.
Figure 13:
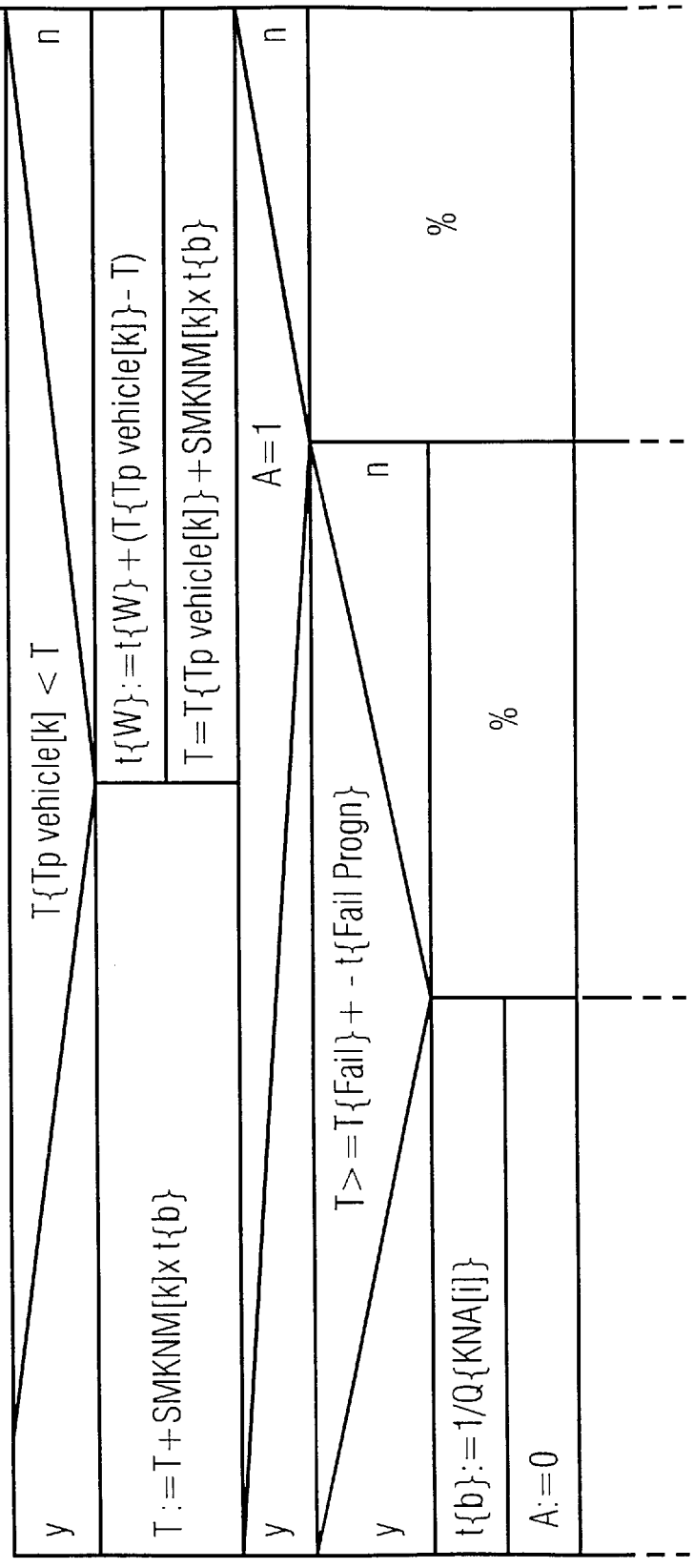
Figure 13:
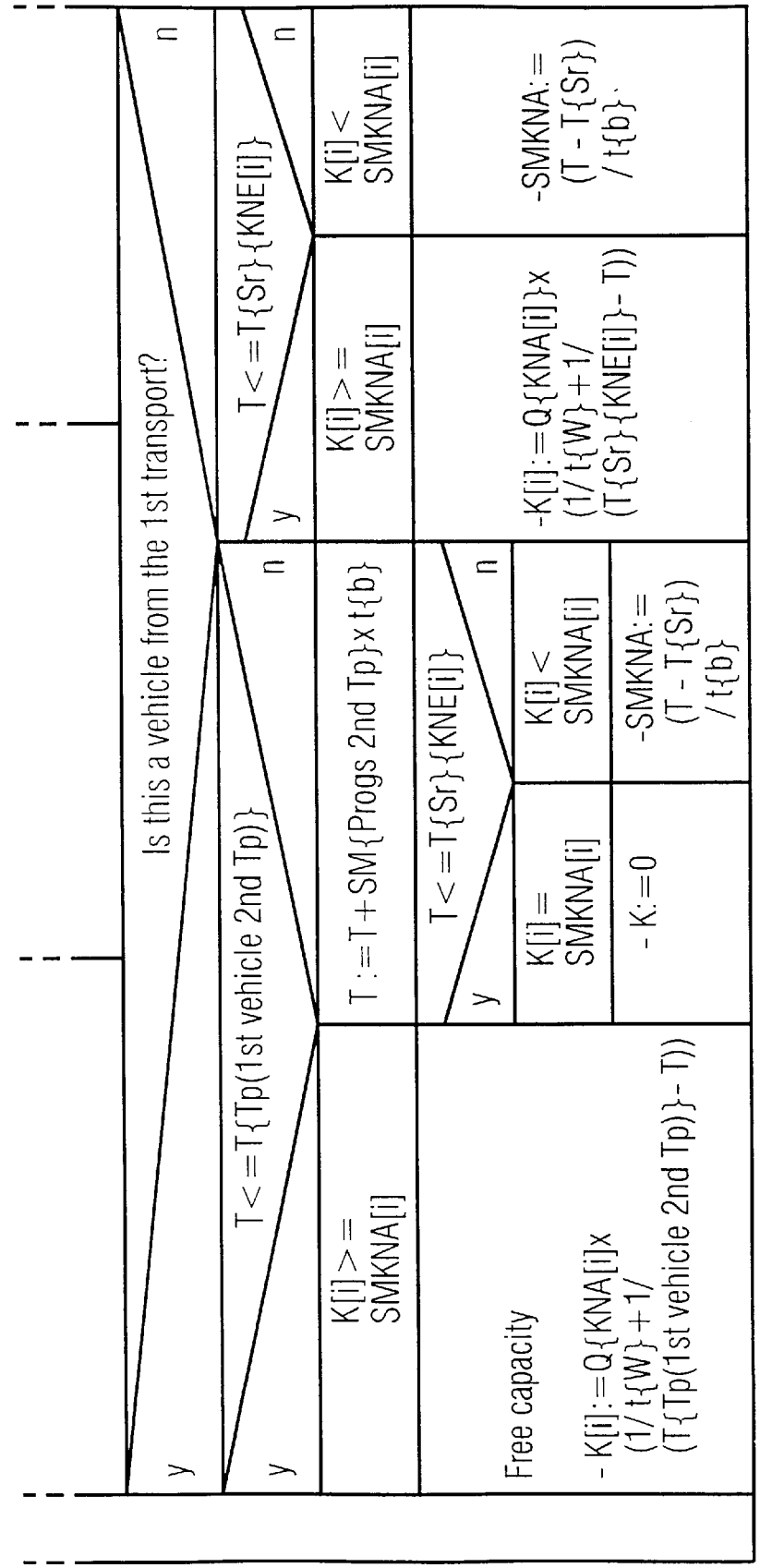

The organizational chart shown in FIGS. 12A and 12B provides a comprehensive representation of the capacity determination KNE (FIG. 12A joins with FIG. 12B at the dotted line). Furthermore, the organizational chart shown in FIGS. 13A–13C (FIGS. 13A and 13B join at the dotted line and FIGS. 13B and 13C join at the dot-dash line) provide a comprehensive representation of the capacity determination KNA.

As already mentioned, been dispatches (mailed articles) should not be diverted to a different node from that of the nominal flowpath unless the dispatch quantity which is present for the node on the nominal flowpath for processing exceeds its capacity by a specific amount. On the basis of the knowledge that one can assume dispatch flows which are distributed on an Erlang basis when the traffic volumes in the mail service are high, this limit value can be defined as follows for the further investigations:

$$\epsilon=0.8x^b$$

where
x=mean througput of the node
b=scatter parameter of the dispatch flow
In this case, the time which is available for processing dispatches must be specified for x.

Example

The following limit value is obtained for a node in the upper network level for output processing:

Q=96,000 dispatches per hour

Time window for the output processing (14.00–21.00 hrs):

7 h x=672,000 dispatches b=0.82

$\epsilon$=48,000 dispatches

Figure 14:
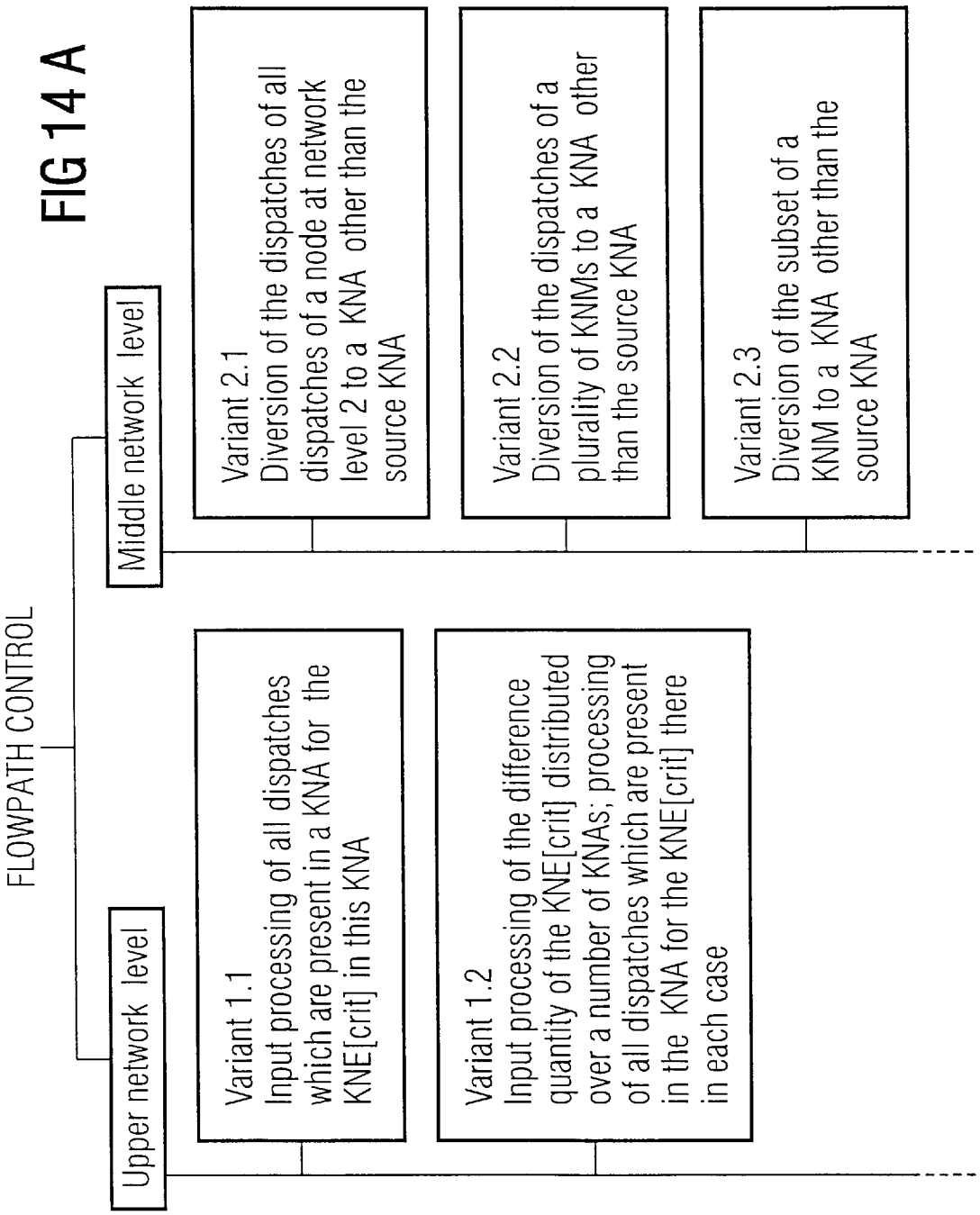
FIGS. 14A and 14B illustrate a flowpath control diagram.
Figure 15:
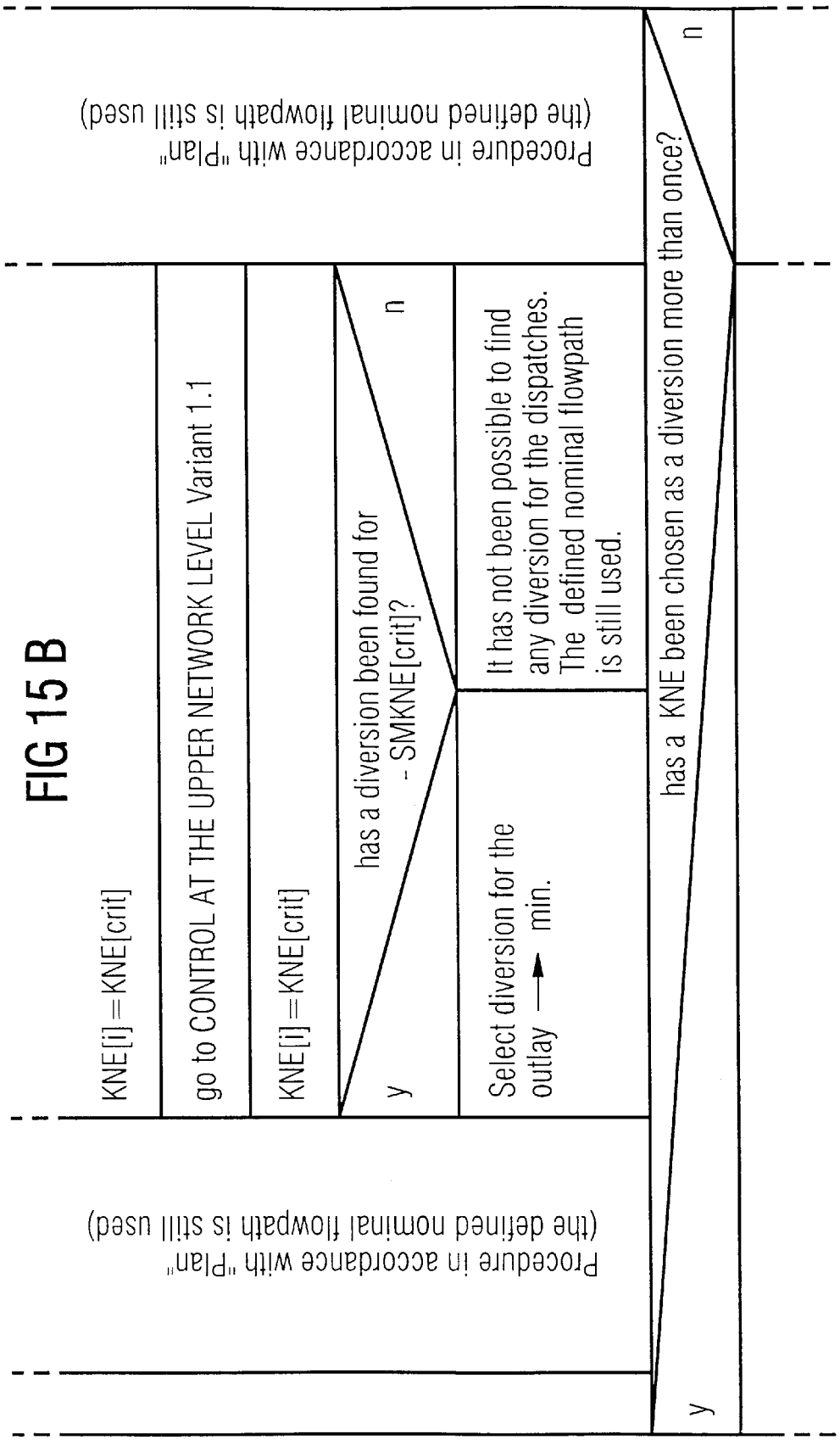
FIGS. 15A–15C are an organizational chart showing control at the upper network level.
Figure 16:
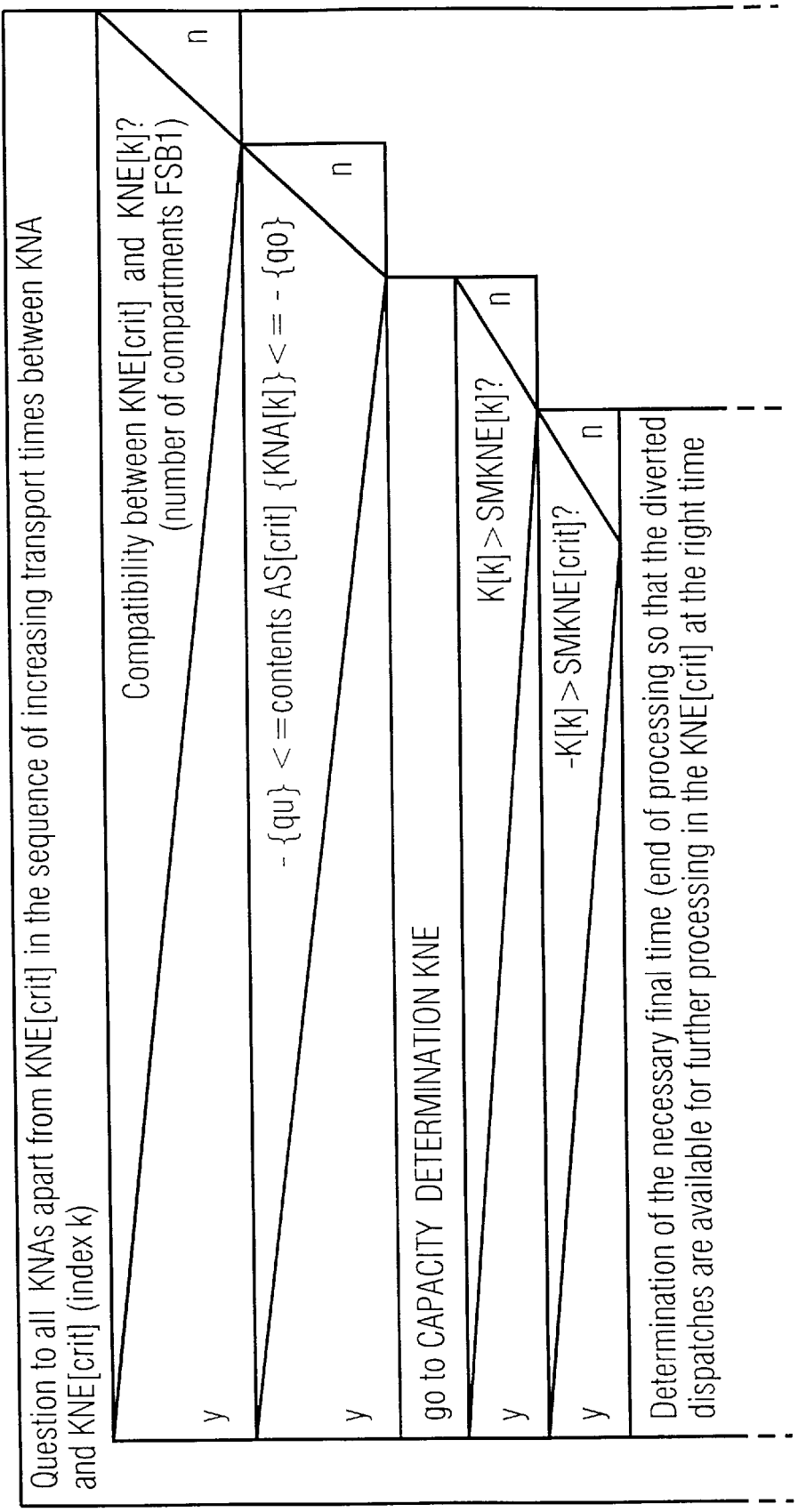
FIGS. 16A and 16B, 17A–17C, 18A and 18B, 19A–19C, and 20A–20C are organizational charts showing control at the upper network level for the Variants 1.1, 1.2, 1.3, 1.4, and 1.5, respectively, that are illustrated in FIGS. 14A and 14B.
Figure 17:
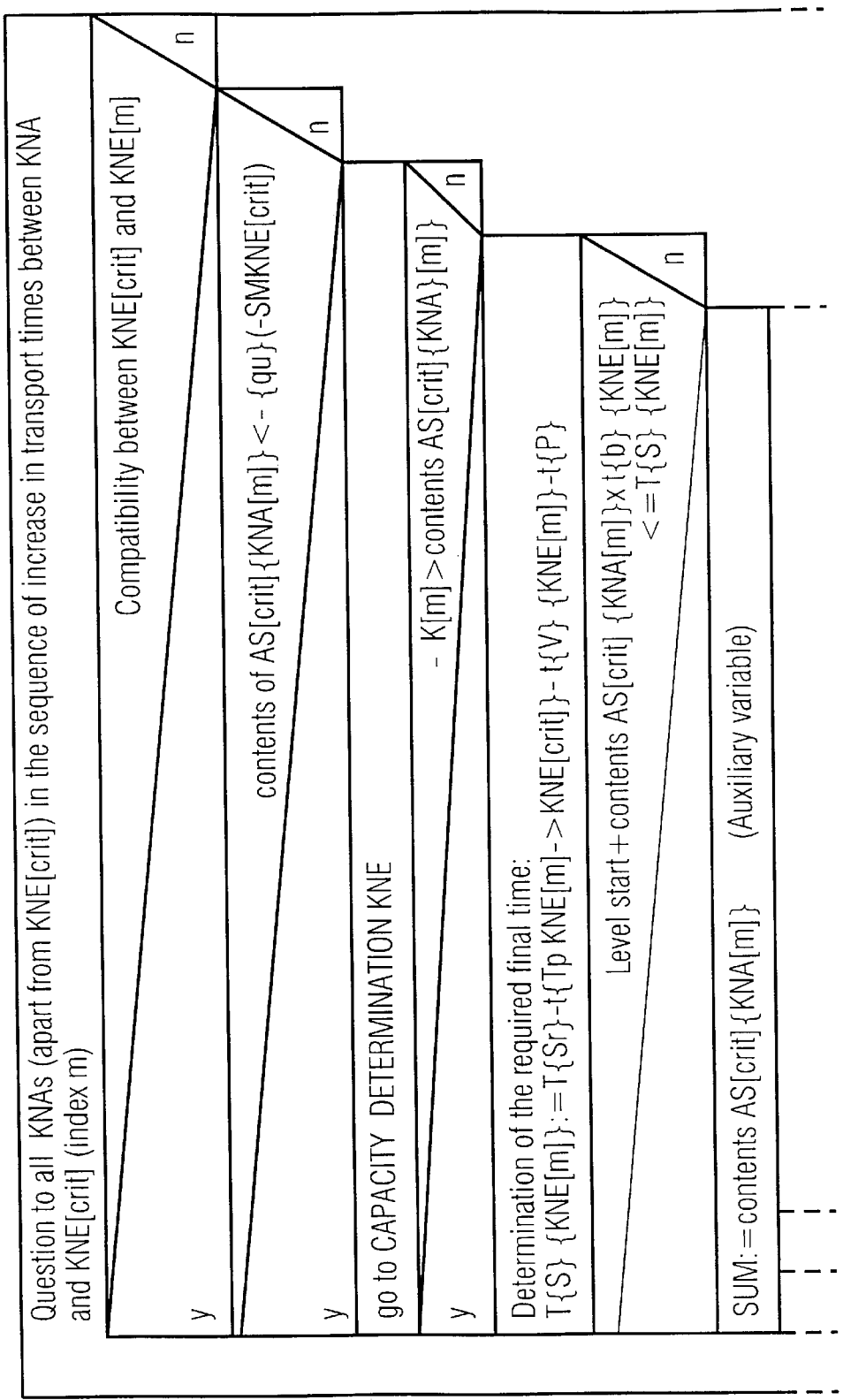
Figure 17:
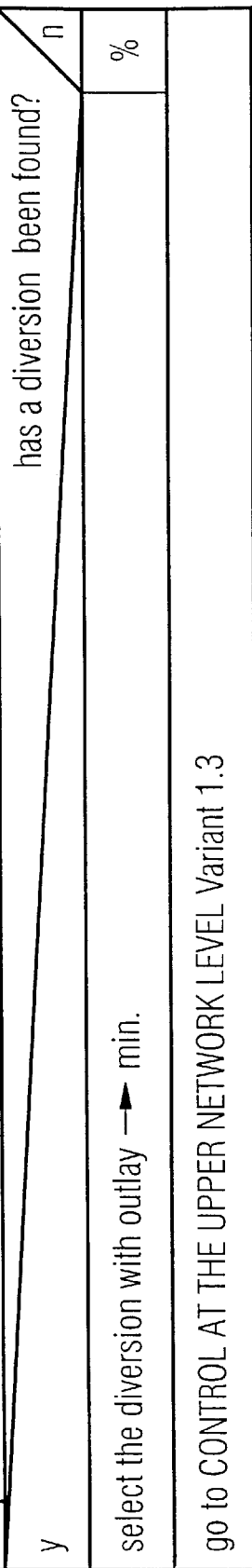
Figure 18:
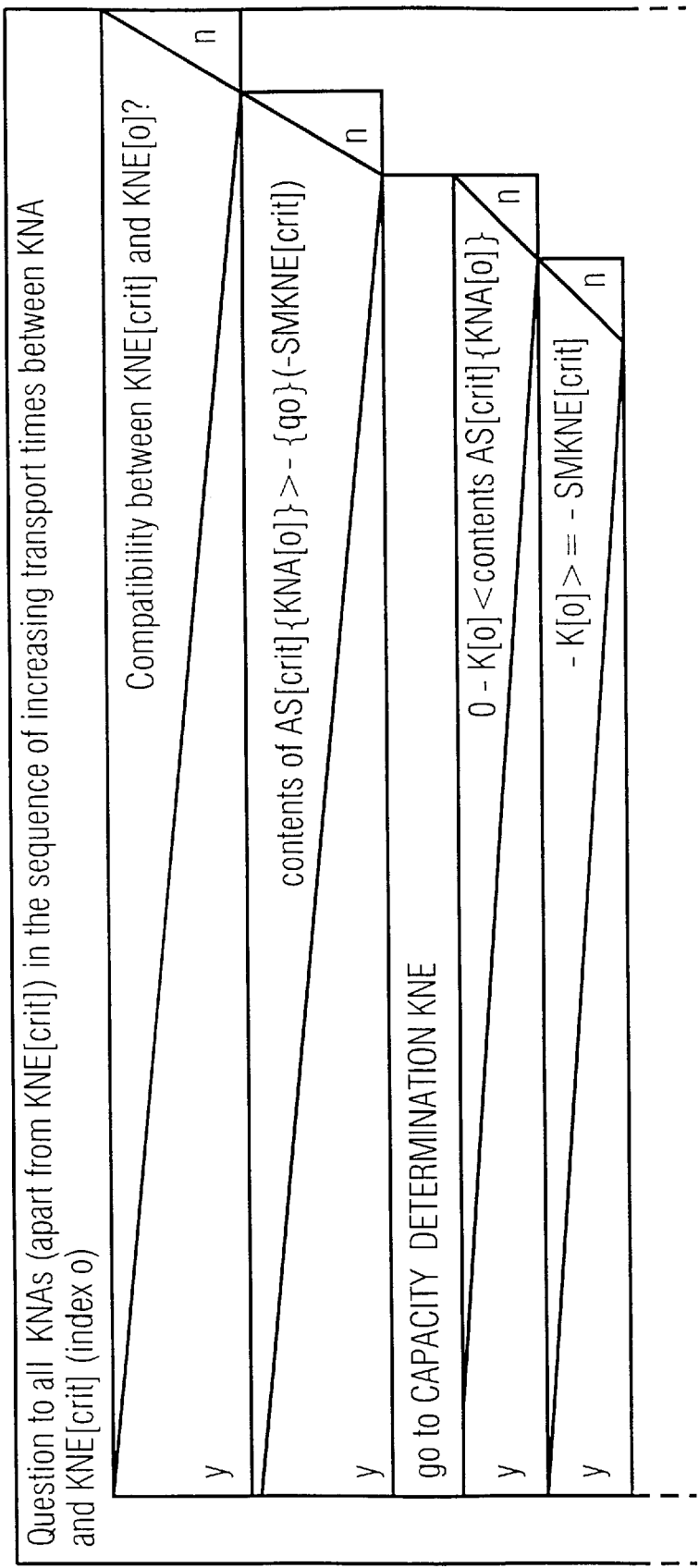
Figure 19:
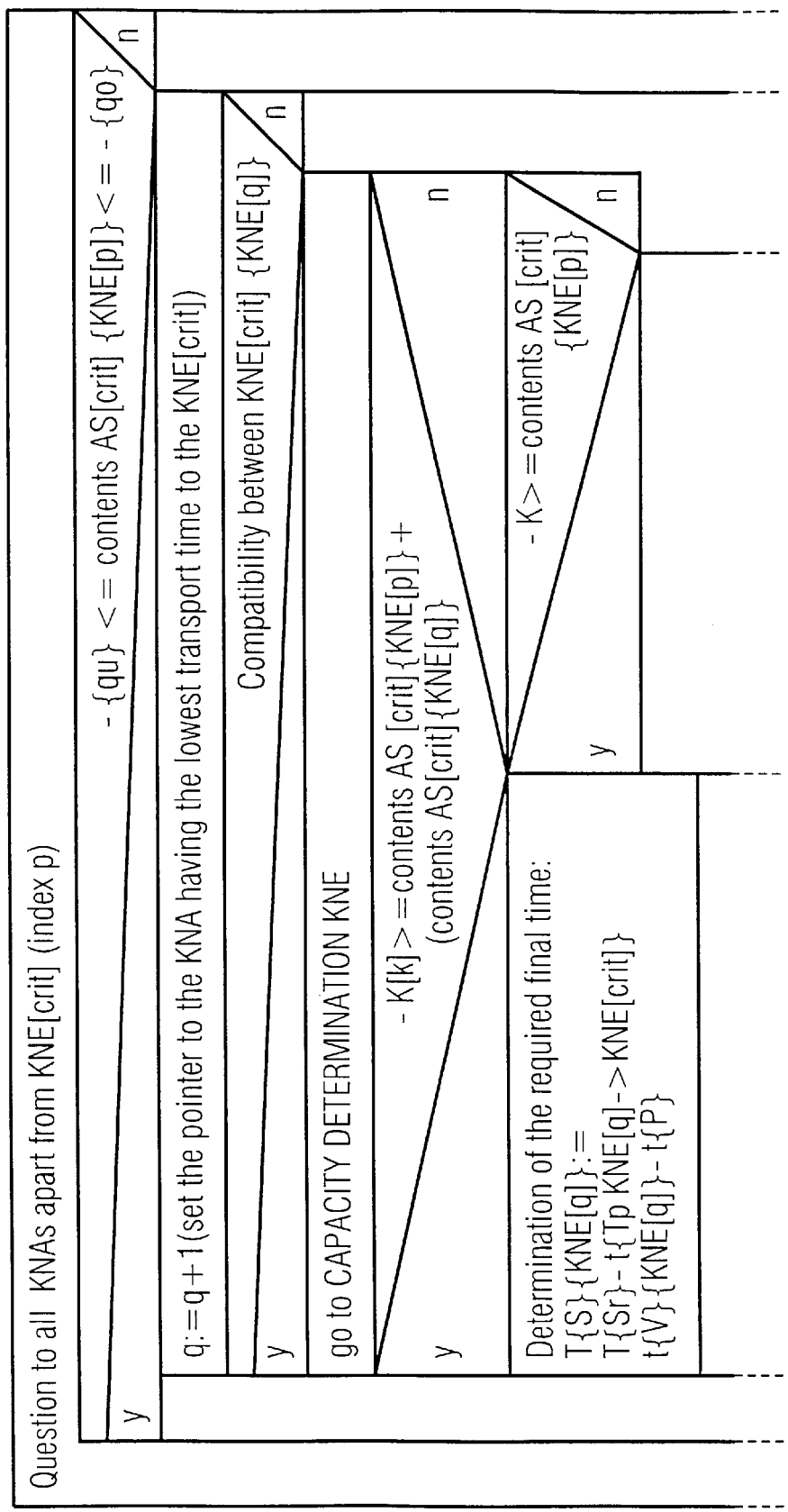
Figure 20:
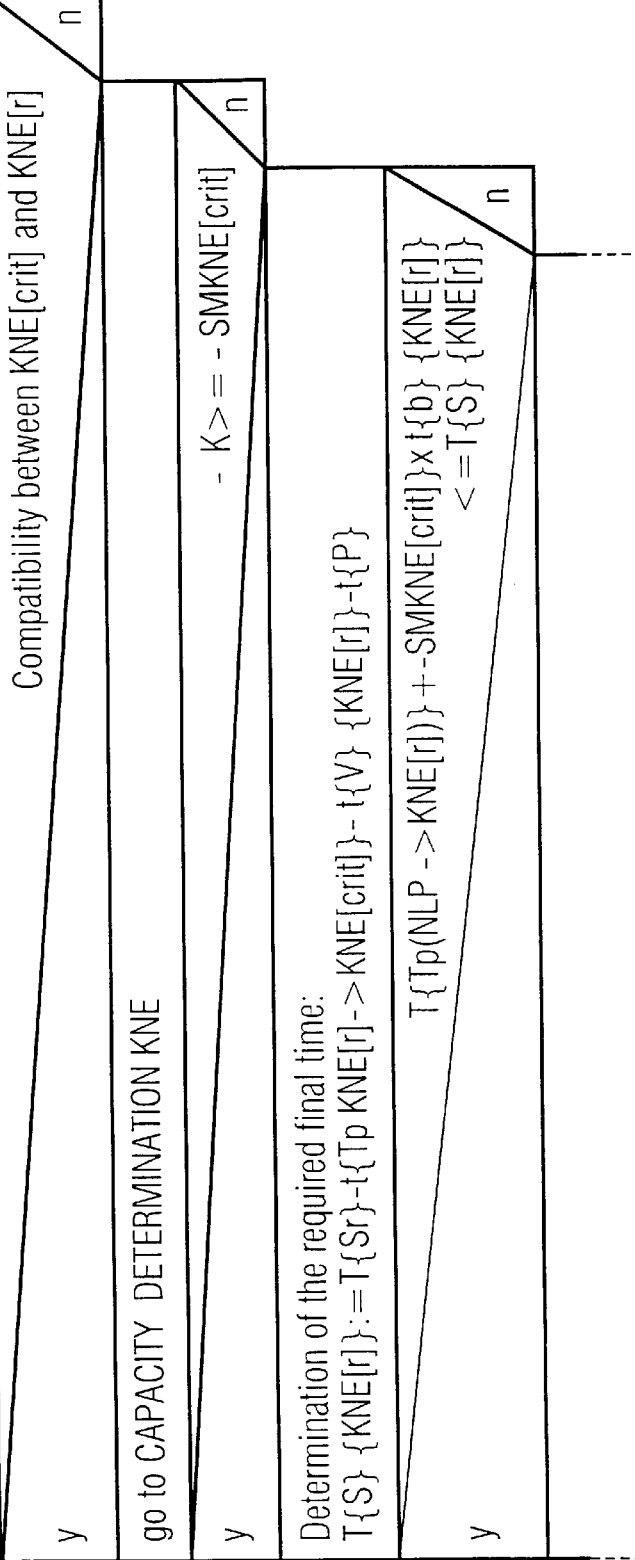
Figure 20:
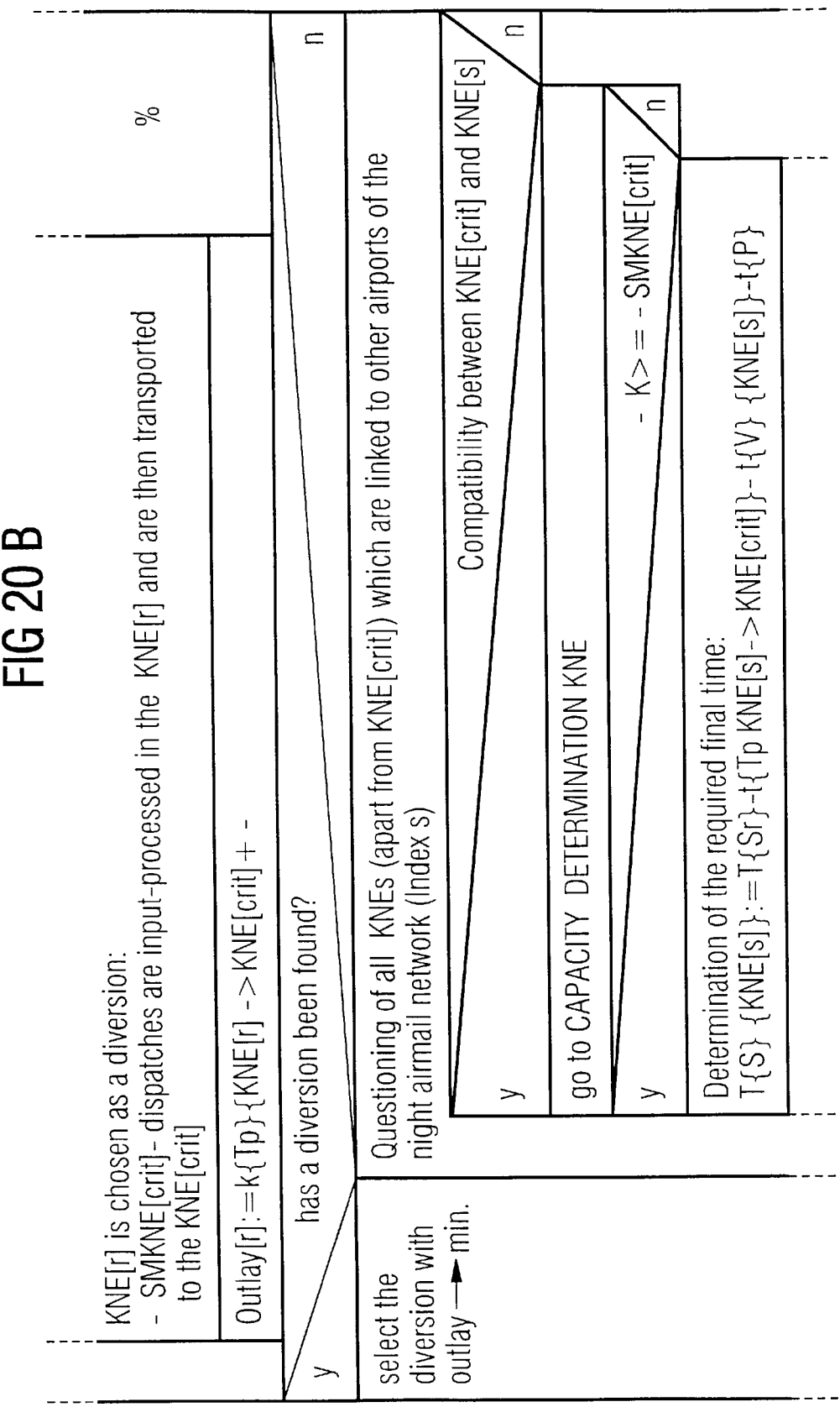
Figure 20:
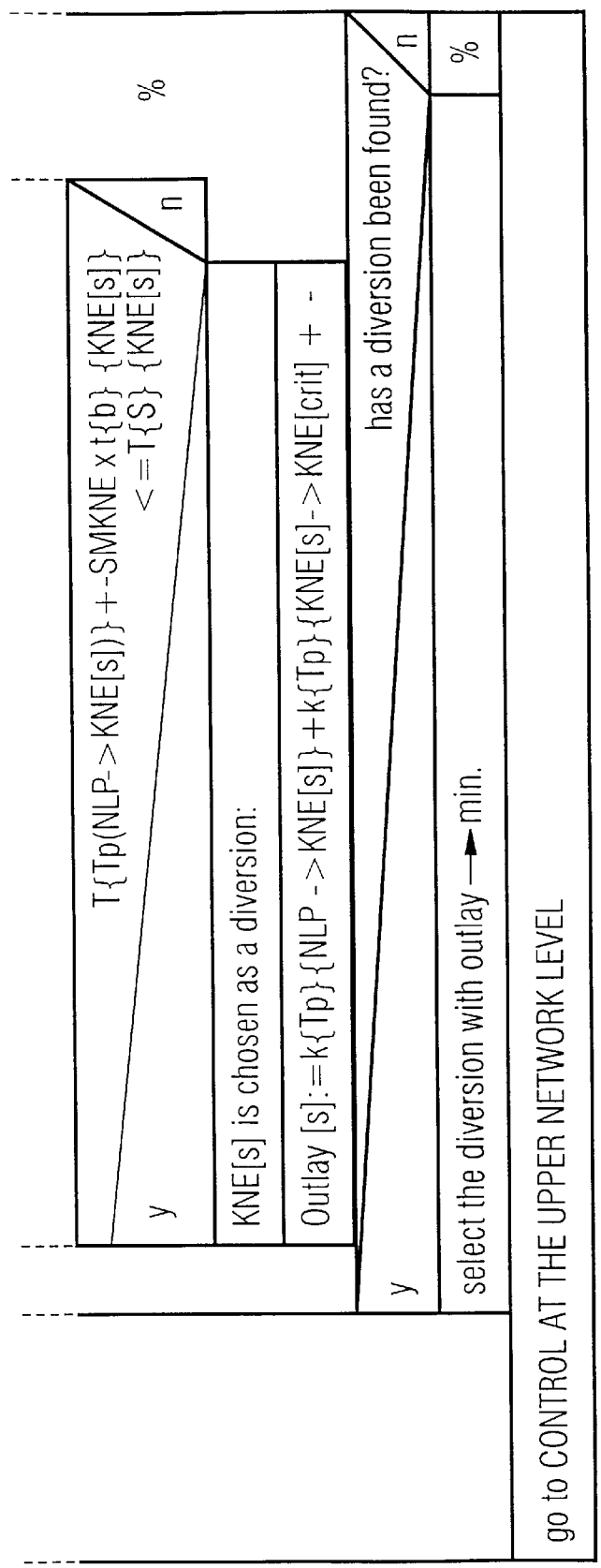
Figure 21:
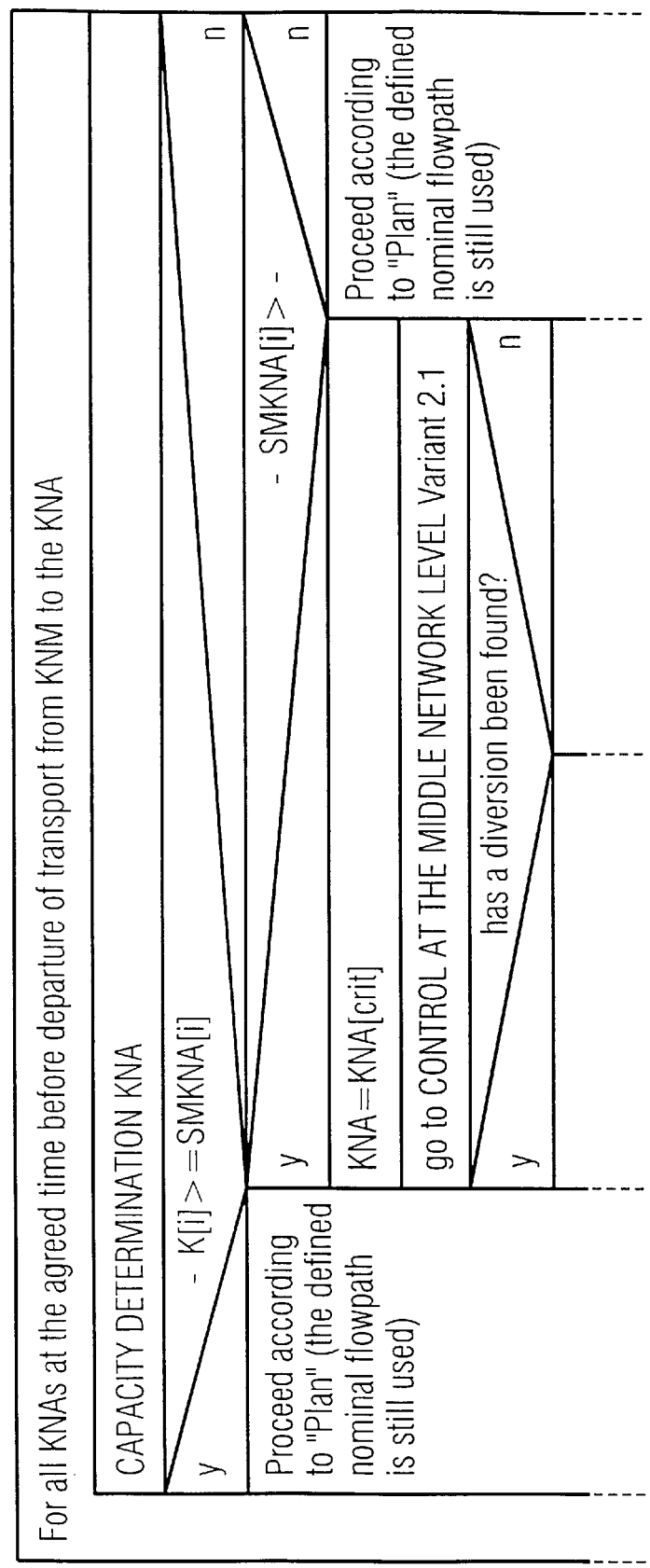
Figure 21:
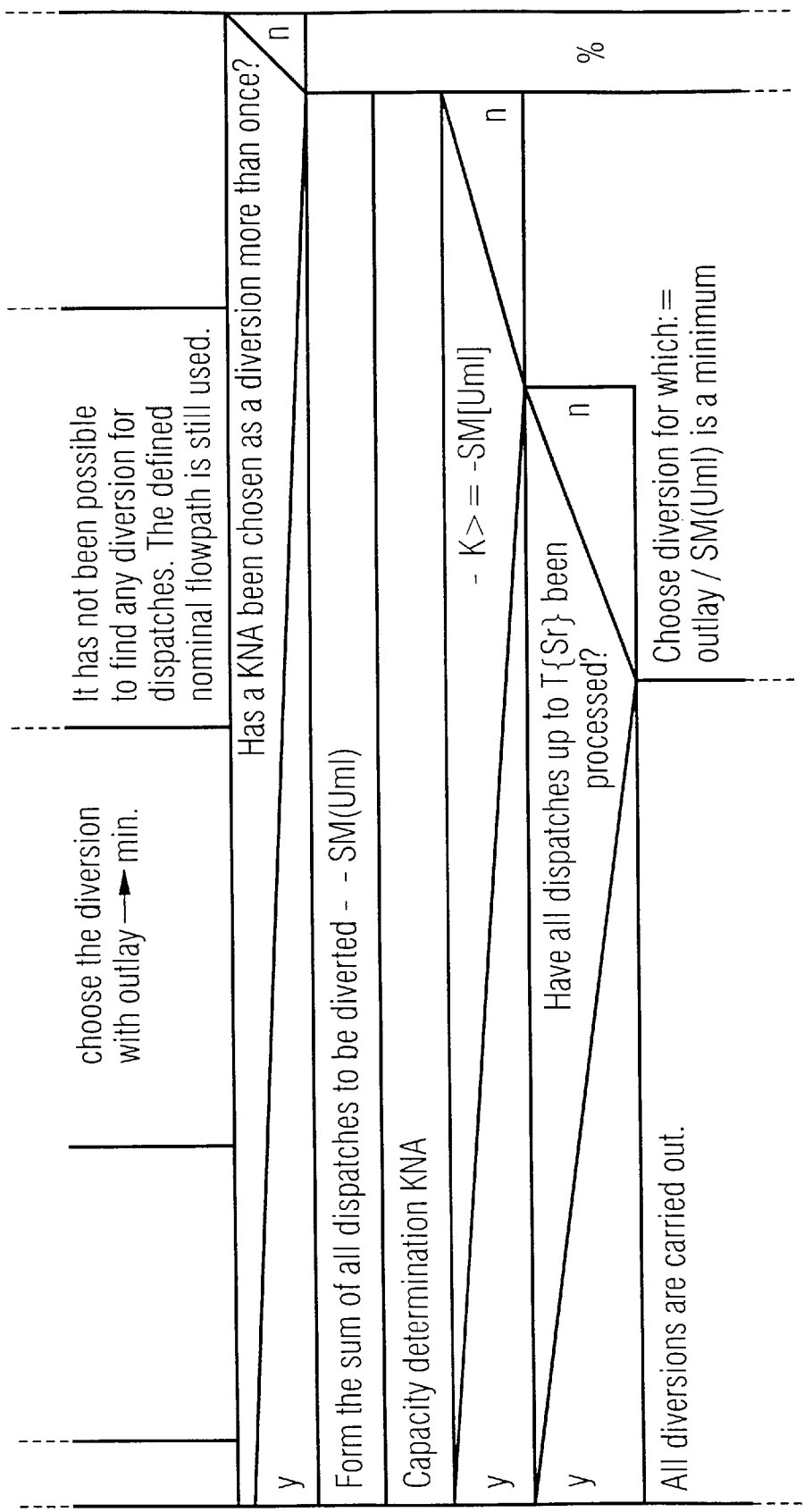
Figure 21:
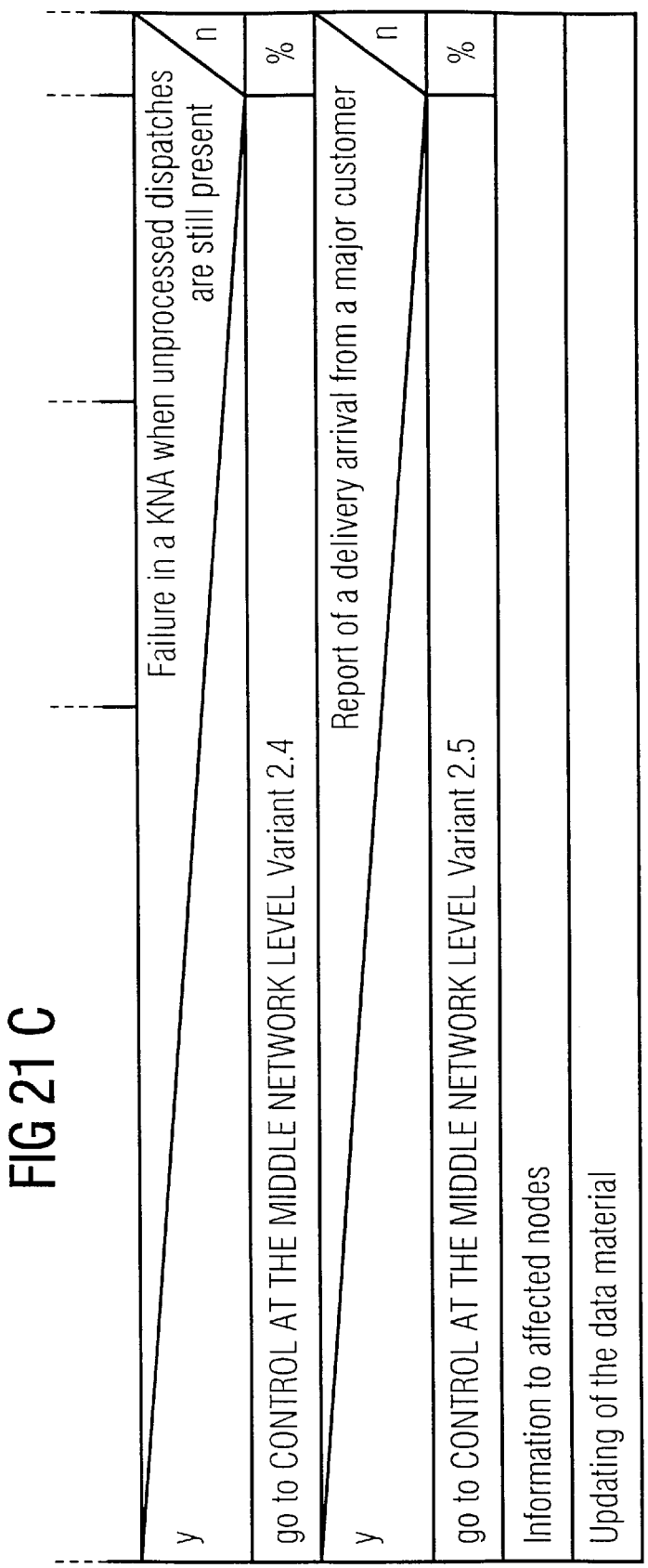
Figure 22:
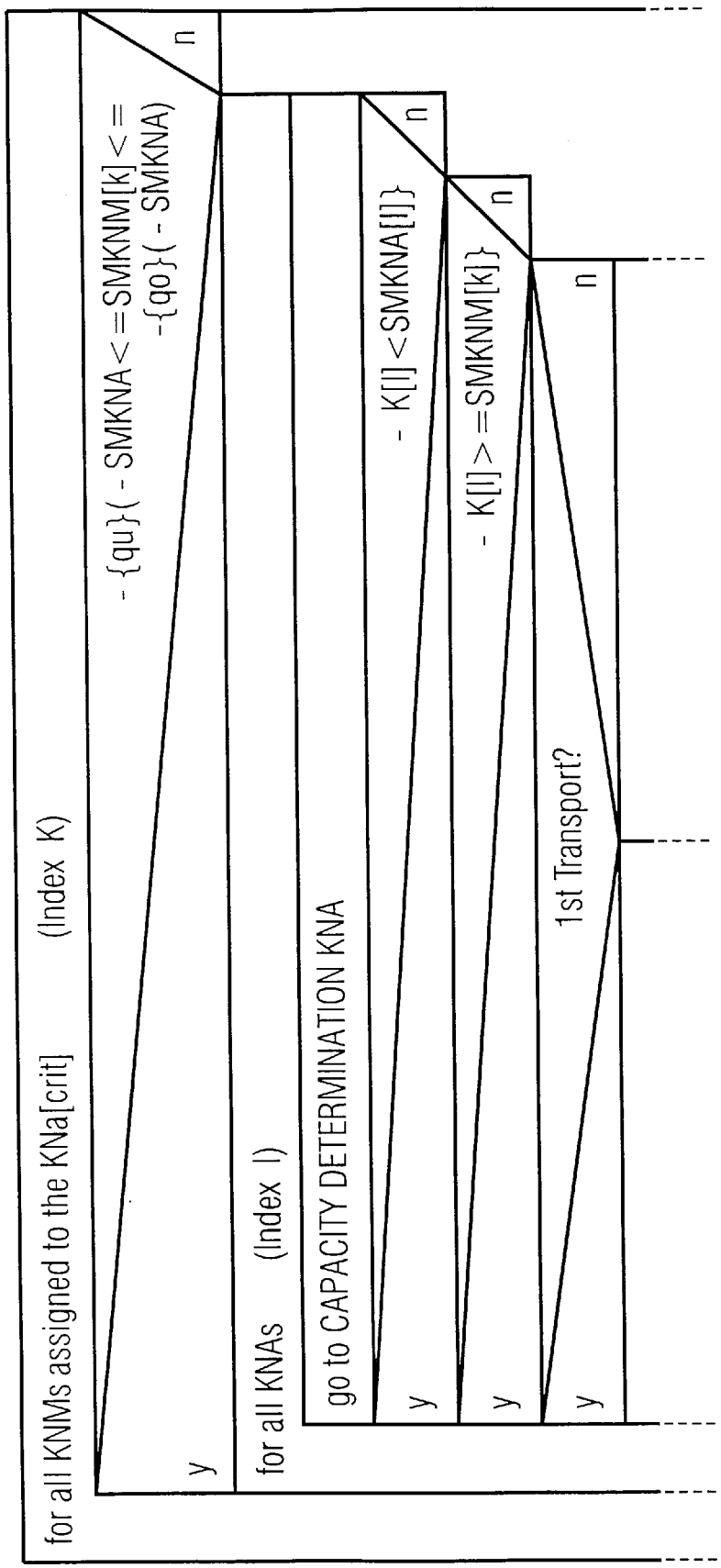
FIGS. 22A and 22B, 23A–23C, 24A and 24B, 25A–25C, and 26A–26C are organizational charts showing control at the middle network level for the Variants 2.1, 2.2, 2.3, 2.4, and 2.5, respectively, that are illustrated in FIGS. 14A and 14B.
Figure 22:
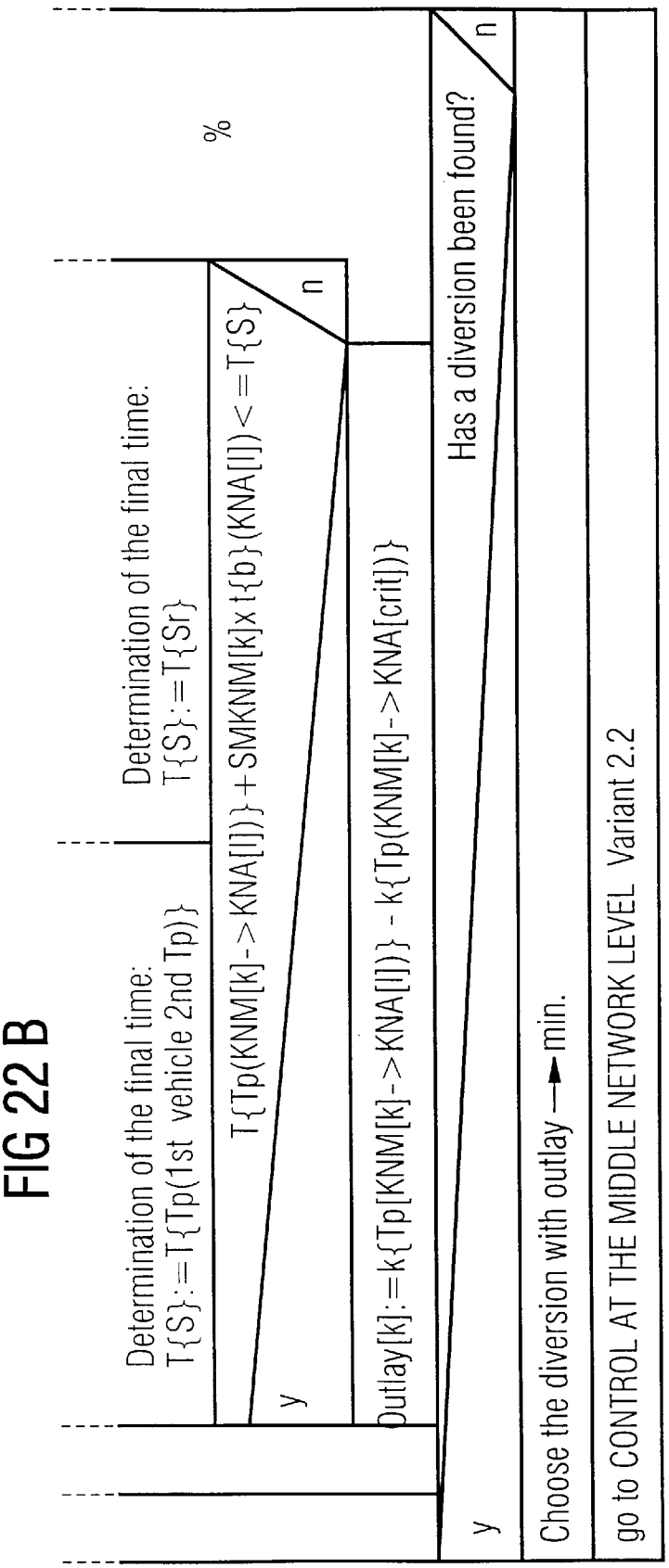
Figure 23:
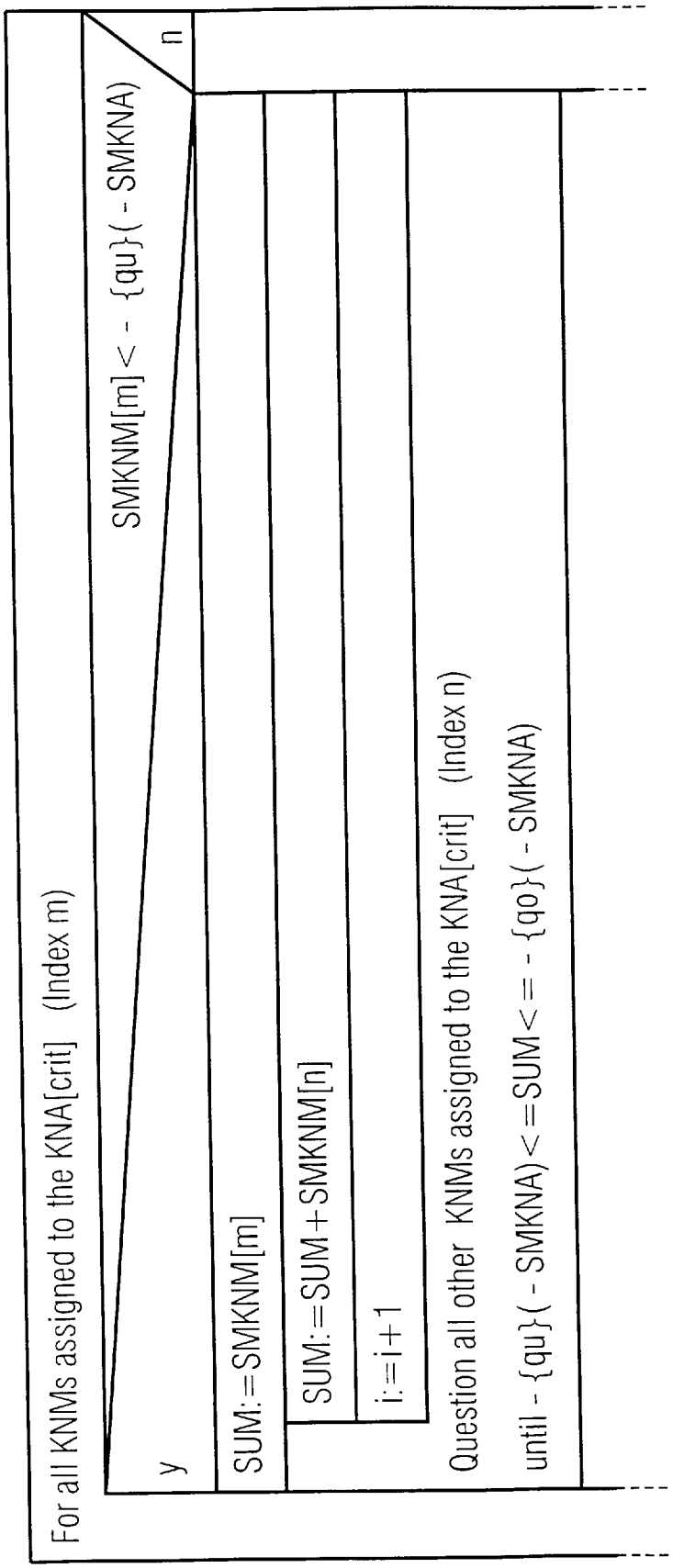
Figure 23:
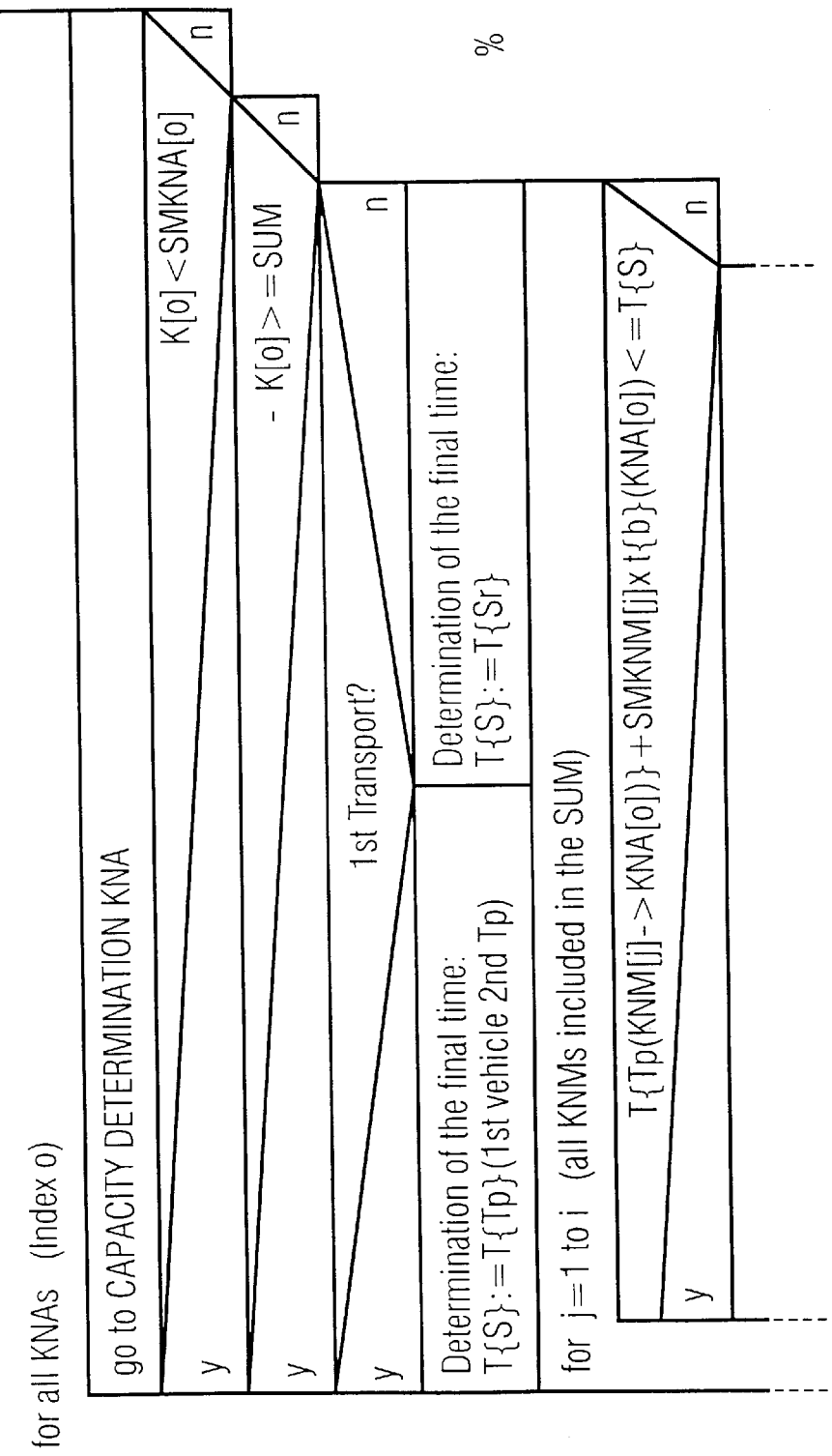
Figure 24:
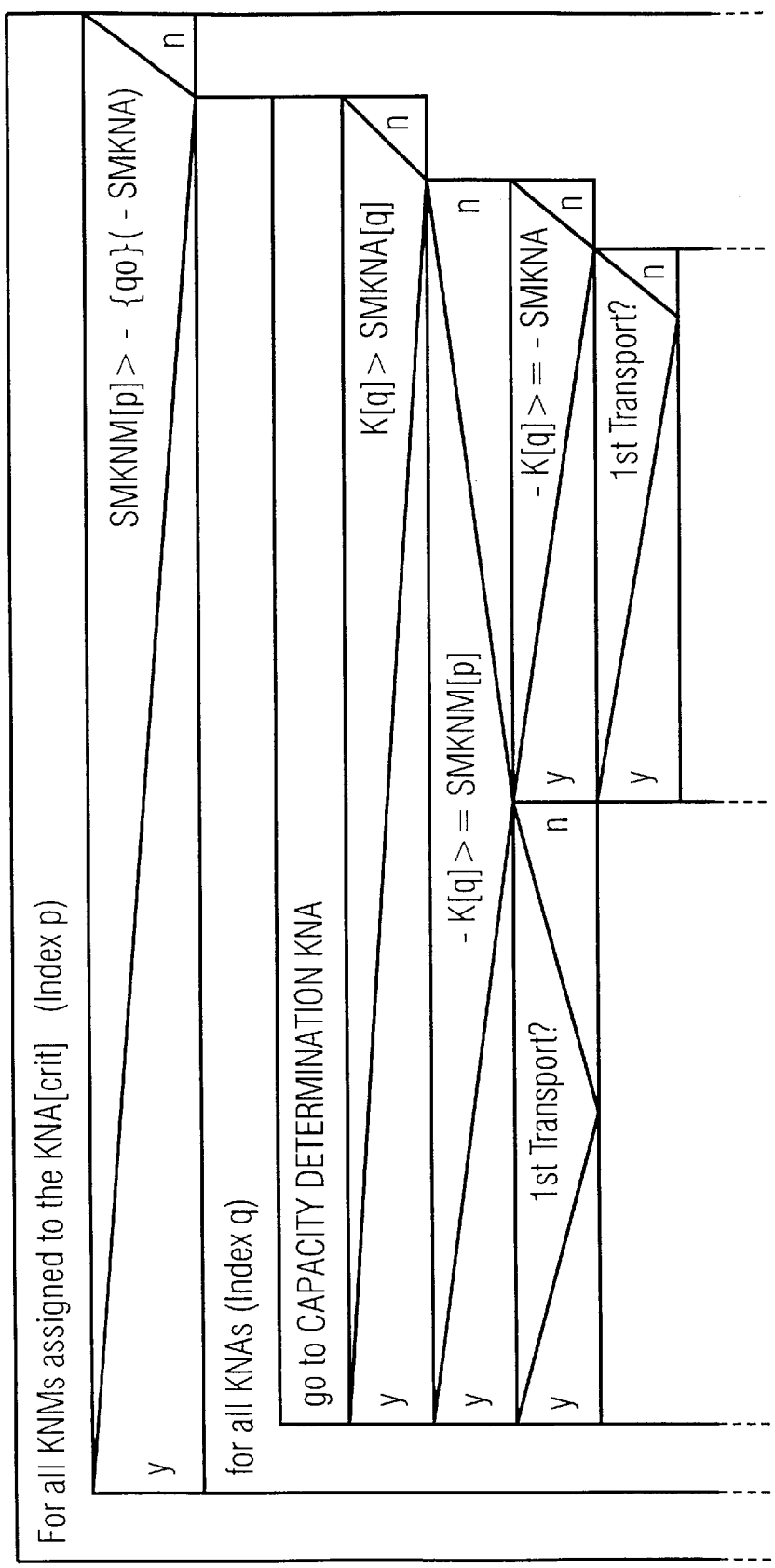
Figure 25:
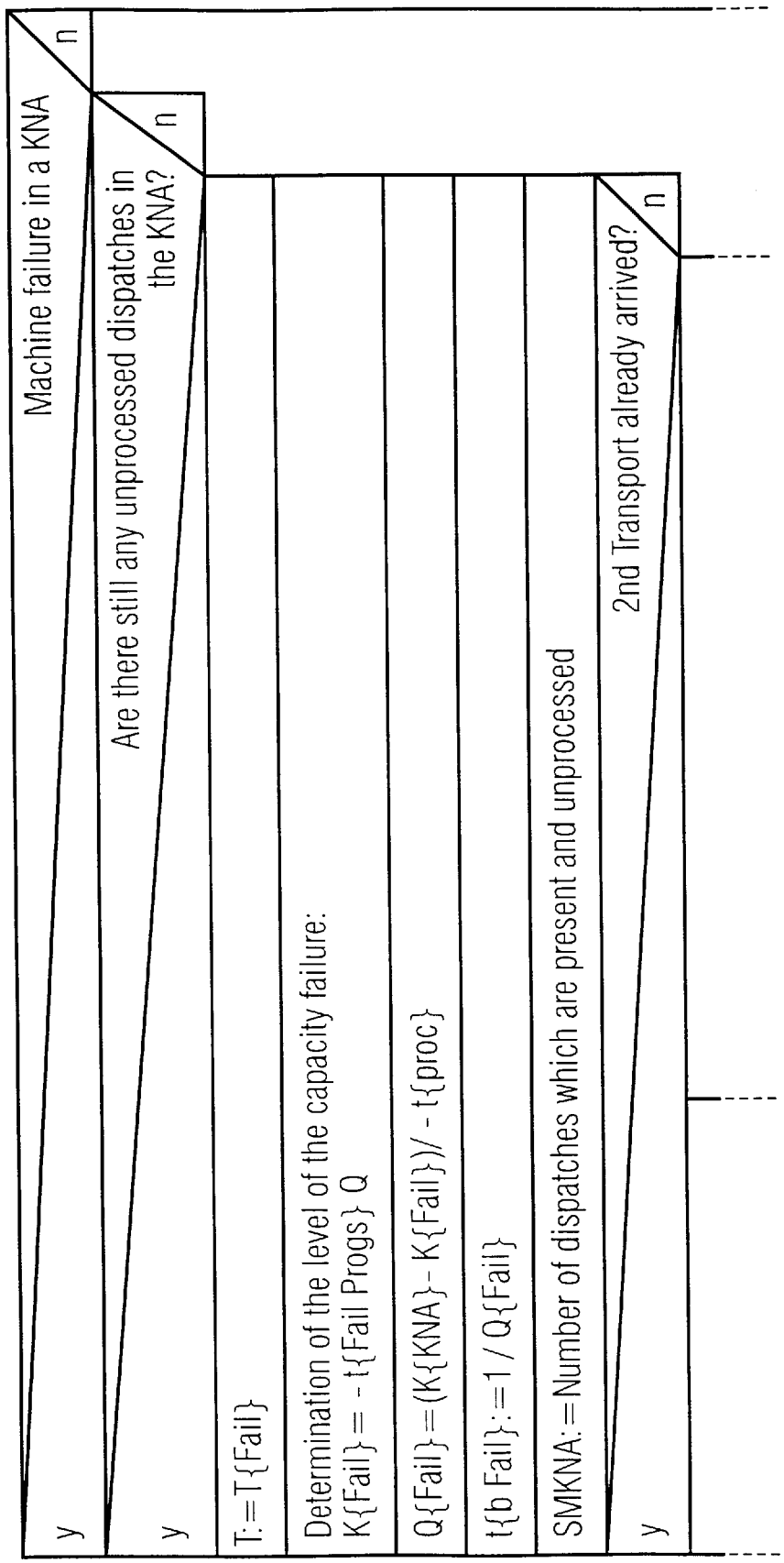
Figure 25:
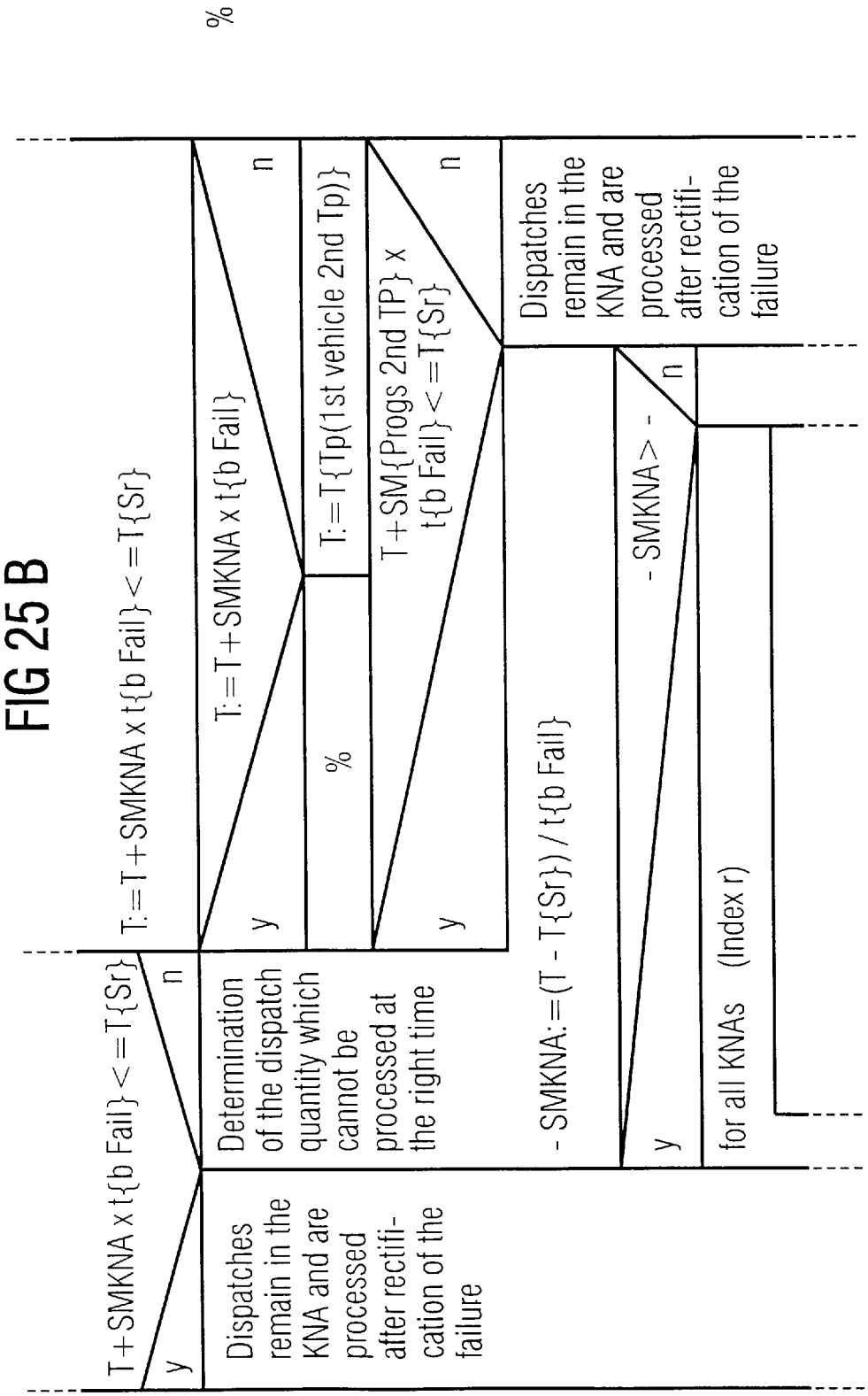
Figure 26:
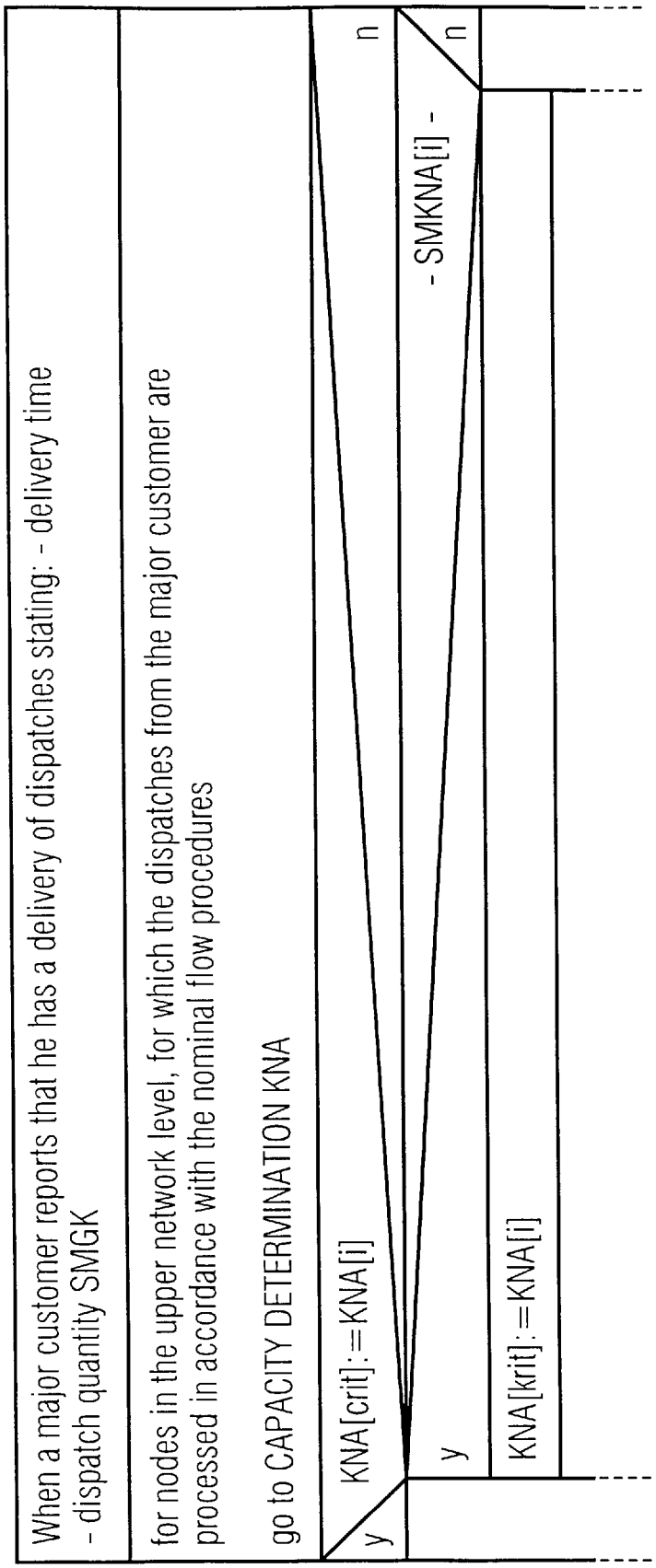
Figure 26:
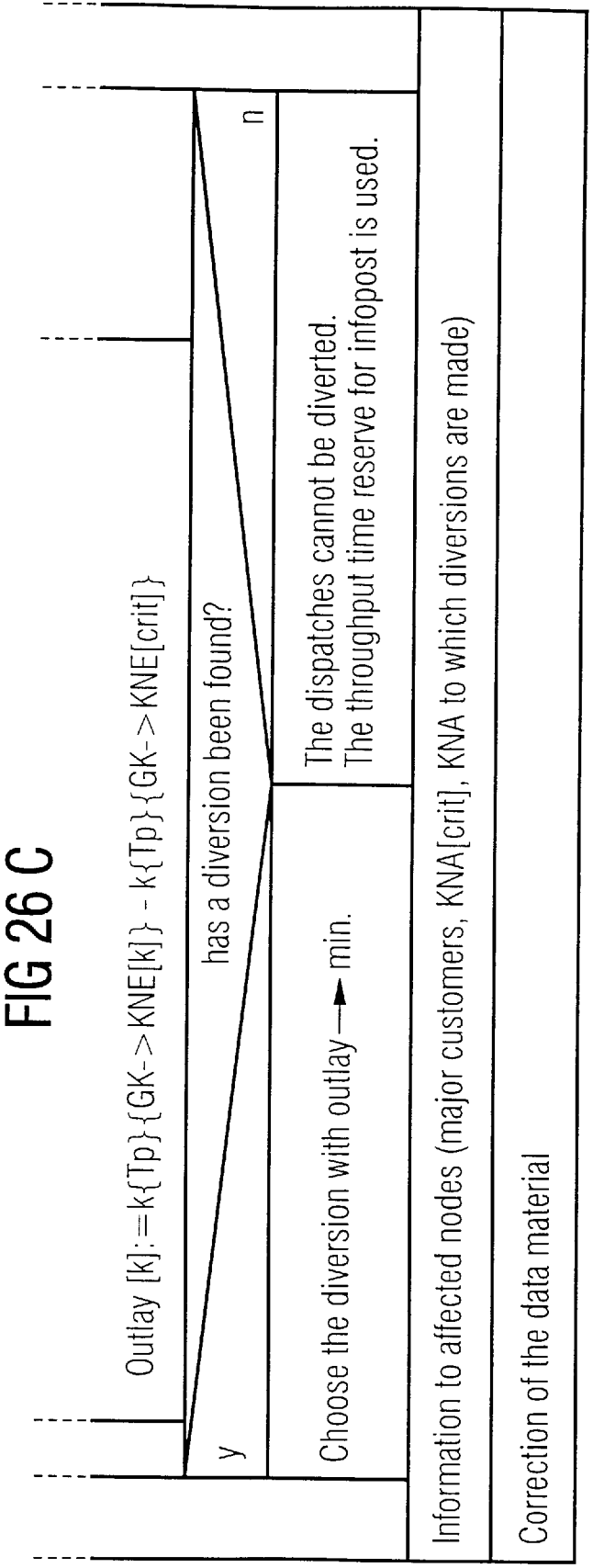

In addition to these movement options, which are called Variants 1.1 and 2.1, on the upper and middle network levels, there are. Other FIGS. 14A and 14B illustrate a flowpath control diagram which includes Variants 1.1 through 1.5 and Variants 2.1 through 2.5. FIGS. 15A–15 are an organizational chart showing control at the upper network level. FIGS. 16A and 16B are another organizational chart showing control at the upper network level for Variant 1.1. FIGS. 17A–17C are an organizational chart showing control at the upper network level for Variant 1.2. FIGS. 18A and 18B are an organizational chart showing control at the upper network level Variant 1.3. FIGS. 19A–19C are an organizational chart showing control at the upper network level for Variant 1.4. FIGS. 20A–20C are an organizational chart showing control at the upper network level for Variant 1.5. FIGS. 21A–21C are an organizational chart showing control at the middle network level. Organizational charts showing control at the middle network level for Variant 2.1 (See FIGS. 22A and 22B), Variant 2.2 (see FIGS. 23A–23C), Variant 2.3 (FIGS. 29A and 29B), Variant 2.4 (See FIGS. 25A–25C), and Variant 2.5 (see FIGS. 26A–26C) are also provided. FIGS. 3 to 7 show the Variants 1.1 to 1.5; Variant 2.1 is shown in FIG. 8.

TABLE

List of Abbreviations and Formula Symbols $AS_i$ Output store with dispatches for node i b Scatter parameter BZA Letter center output BZE Letter center input E+1 Delivery on the day after receipt (Statement of throughput time, typical for mail dispatches)

K Capacity $\Delta K$ Free capacity k Parameter relating to Erlang-k distribution $k_{Tp}$ Transport costs, number of KNMs assigned to one KNA KN Node in the upper network level KNA Node in the upper network level for output processing $KNA_{crit}$ KNA with capacity less than the dispatch quantity to be processed KNE Node in the upper network level Nodes $KNE_{crit}$ KNE with capacity less than the dispatch quantity to be processed KNM Node in the middle network level LB Flow area m Number of KNMs assigned to one KNA n Sample size, number of KNs of a diversion Q Nominal throughput $Q_{Fail}$ Throughput of a node in the defective state Qu Source R Residues Sdg Dispatches Se Sink $SM_{progs}$ Predicted dispatch quantity $SM_{Tp}$ Dispatch quantity of a transport $SM_{Uml}$ =Diverted dispatch quantity SMKNA Dispatch quantity which is present in the KNA for processing SMKNE Dispatch quantity which is present in the KNE for processing SMKNM Dispatch quantity which is in a KNM for further processing in a KNA $\Delta$SMKNA Dispatch quantity which cannot be processed in the KNA within the specified time window because of capacity $\Delta$SMKNE Dispatch quantity which cannot be processed in the KNE within the specified time window because of capacity T Time [h:min]

$T_{Fail}$ Failure time $T_S$ Final time $T_{Sr}$ Regular final time $T_{Tp}$ Transport arrival time $T_{TpUml}$ Diverted transport arrival time t Time $t_b$ Mean processing time $t_p$ Buffer time $t_{Tp}$ Transport time $t_v$ Time for dispatch completion $t_w$ Waiting time $\Delta t_{Failprogs}$ Predicted failure duration $\Delta t_b$ Time window for processing Tp Transport $\bar{x}$ Mean value $\epsilon$ Limit value $\lambda$ Parameter for the Erlang-k distribution $\lambda_q$, $\lambda_\gamma$, $\lambda_{1-q}$, $\lambda_{1-\gamma}$ Quantiles of the standardized normal distribution $\kappa$ Fixed value, outlay which is involved in diversion of a dispatch in the upper network level (for example by changing the machine programs for the fine sorting

What is claimed is:

1. A logistics network comprising:

means for performing acceptance, processing and passing on of mailed articles, which are directed from a sender to a recipient, in a temporally and locally predetermined sequence, the means for performing including edges and nodes;

means for detecting discrepancies between requirements data, which describe requirements imposed on the logistics network if a predetermined quality standard is to be maintained, and actual measured data, and control means for minimizing the discrepancies in a predetermined time by moving the processing of mailed articles from at least one node, whose capacity is less than the requirements data, to at least one other node, wherein a minimal additional outlay or expense is incurred.

2. The logistics network as claimed in claim 1, wherein the network has an upper network level, and wherein a first subset of the nodes forms the upper network level, the nodes forming the upper network level having I/O means for input and output processing of mailed articles.

3. The logistics network as claimed in claim 2, wherein the network has at least one middle network level, and wherein a second subset of nodes forms the at least one middle network level.

4. A method for controlling a logistics network so that processing is moved from at least one node, whose capacity is less than the requirements data, to at least one other node and a minimal additional outlay or expense is incurred, comprising utilizing the logistics network according to claim 1.

5. A method for controlling a logistics network so that, if a node has an existing capacity for input processing that is not sufficient, excess input processing beyond the existing capacity is moved to at least one other node to achieve the requirements data of this at least one other node, comprising utilizing the logistics network according to claim 2.

6. A method for controlling a logistics network so that, if a node has an existing capacity for output processing that is not sufficient, excess output processing beyond the existing capacity is moved to at least one other node to achieve the requirements data of this at least one other node, comprising utilizing the logistics network according to claim 2.

7. The method as claimed in claim 4, wherein the processing is not moved from one node to another node unless a quantity of mailed articles intended for processing by said one node exceeds the available capacity there by a predetermined value $\epsilon$.

8. The method as claimed in claim 7, wherein $\epsilon=0.8\ X^b$, where X=mean throughput of said one node and $b=0.75$ to $0.82$.

9. The method as claimed in claim 5, wherein the processing is not moved from one node to another node unless a quantity of mailed articles intended for processing by said one node exceeds the available capacity there by a predetermined value $\epsilon$.

10. The method as claimed in claim 9, wherein $\epsilon=0.8\ X^b$, where X=mean throughput of said one node and $b=0.75$ to $0.82$.

11. The method as claimed in claim 6, wherein the processing is not moved from one node to another node unless a quantity of mailed articles intended for processing by said one node exceeds the available capacity there by a predetermined value $\epsilon$.

12. The method as claimed in claim 11, wherein $\epsilon=0.8\ X^b$, where X=mean throughput of said one node and $b=0.75$ to $0.82$.

13. A method for controlling a logistics network having a plurality of nodes for processing articles between receipt of the articles from senders and delivery of the articles to receivers, comprising;
 (a) assigning articles to the nodes in a predetermined manner if predetermined throughput requirements can be maintained;
 (b) detecting whether any of the nodes wold be overloaded and thus unable to maintain the throughput requirements as a result of the assignment in step (a);
 (c) determining whether any other nodes have excess processing capacity; and
 (d) dynamically modifying the predetermined manner of assigning articles to nodes so as to divert articles from a node that was detected as being overloaded in step (b) to a node that was determined to have excess capacity in step (c) if the throughput requirements can be maintained as a result of the diversion.

\* \* \* \* \*

UNITED STATES PATENT AND TRADEMARK OFFICE
CERTIFICATE OF CORRECTION

PATENT NO : 5,870,715
DATED : February 9, 1999
INVENTOR(S): Beate BELITZ, et al.

It is certified that error appears in the above-identified patent and that said Letters Patent is hereby corrected as shown below:

On title page, under [73], "Licentia Patent-Verwaltungs-GmbH, Frankfurt, Germany" should be --Siemens Aktiengesselschaft, Muenchen, Germany--

Signed and Sealed this

Fifth Day of October, 1999

Attest:

Q. TODD DICKINSON

Attesting Officer

Acting Commissioner of Patents and Trademarks